US010923799B2

(12) United States Patent
Lee et al.

(10) Patent No.: US 10,923,799 B2
(45) Date of Patent: Feb. 16, 2021

(54) ANTENNA STRUCTURE AND ELECTRONIC DEVICE THEREWITH

(71) Applicants: Samsung Electronics Co., Ltd., Suwon-si (KR); Hansol Technics Inc., Seoul (KR)

(72) Inventors: Woosup Lee, Suwon-si (KR); Jinkyung Kim, Seoul (KR); Younju Kim, Suwon-si (KR)

(73) Assignees: Samsung Electronics Co., Ltd., Suwon-si (KR); Hansol Technics Inc., Seoul (KR)

( * ) Notice: Subject to any disclaimer, the term of this patent is extended or adjusted under 35 U.S.C. 154(b) by 0 days.

(21) Appl. No.: 16/692,221

(22) Filed: Nov. 22, 2019

(65) Prior Publication Data

US 2020/0168979 A1 May 28, 2020

(30) Foreign Application Priority Data

Nov. 22, 2018 (KR) .................. 10-2018-0145457

(51) Int. Cl.
*H01Q 1/22* (2006.01)
*H04B 5/00* (2006.01)
*H02J 50/12* (2016.01)

(52) U.S. Cl.
CPC .......... *H01Q 1/2283* (2013.01); *H02J 50/12* (2016.02); *H04B 5/0031* (2013.01); *H04B 5/0037* (2013.01); *H04B 5/0081* (2013.01)

(58) Field of Classification Search
CPC .. H01Q 1/2283; H04B 5/0031; H04B 5/0081; H04B 5/0037; H02J 50/12; H04W 4/80
See application file for complete search history.

(56) References Cited

U.S. PATENT DOCUMENTS 10,269,005 B2 4/2019 Lee et al.
2018/0138746 A1* 5/2018 Jang ................. H01F 38/14
(Continued)

FOREIGN PATENT DOCUMENTS

EP        3 048 666 A2    7/2016
KR  10-2009-0030837 A    3/2009
(Continued)

OTHER PUBLICATIONS

International Search Report with Written Opinion dated Mar. 26, 2020; International Appln. No. PCT/KR2019/016182.

*Primary Examiner* — Lester G Kincaid
*Assistant Examiner* — Maryam Soltanzadeh
(74) *Attorney, Agent, or Firm* — Jefferson IP Law, LLP

(57) ABSTRACT

An antenna structure is provided that improves performance of a Near Field Communication antenna by constructing a pattern for NFC in an inner center region of a pattern for a wireless charging pad. The structure includes a Printed Circuit Board including a first and a second substrate layer, where the first substrate layer includes a first and a second non-conductive area, one first conductive wire constructed in a shape surrounding the first non-conductive area, one second conductive wire constructed in a shape surrounding the second non-conductive area, and a first antenna corresponding to a first frequency band. The second substrate layer includes a third non-conductive area, a third wire surrounding the third non-conductive area, and connection wires electrically coupling the first and the second conductive wire forming a second winding. The first winding and the second winding are a second antenna corresponding to a second frequency band.

20 Claims, 21 Drawing Sheets

(56) References Cited

U.S. PATENT DOCUMENTS

2018/0159598 A1\* 6/2018 Ahn .................... H04B 5/0037
2018/0301790 A1 10/2018 Kim et al.

FOREIGN PATENT DOCUMENTS

| KR | 10-2014-0057973 A | 5/2014 |
| KR | 10-2016-0135677 A | 11/2016 |
| KR | 10-2018-0062933 A | 6/2018 |

\* cited by examiner

ANTENNA STRUCTURE AND ELECTRONIC DEVICE THEREWITH

CROSS-REFERENCE TO RELATED APPLICATION(S)

This application is based on and claims priority under 35 U.S.C. § 119(a) of a Korean patent application number 10-2018-0145457, filed on Nov. 22, 2018, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) Hansol Technics Inc.

BACKGROUND

Field

The disclosure relates to an antenna structure of an electronic device, and the electronic device including the same.

Description of Related Art

A plurality of antennas may be disposed to an electronic device. For example, the antenna may be provided with an antenna radiator having a specific shape corresponding to each band. Among at least one antenna employed in the electronic device, an antenna for wireless charging or Near Field Communication (NFC) may be disposed in proximity to a back cover of the electronic device.

The antenna disposed in proximity to the back cover of the electronic device may include, for example, an NFC antenna, a wireless charging antenna, and/or a Magnetic Secure Transmission (MST) antenna. The antenna may, for example, perform NFC with an external device or wirelessly transmit and receive power required for charging.

However, when such an antenna is used as an NFC antenna, a shadow region may occur with respect to an NFC small tag. For example, when the NFC small tag is in proximity to a center region of the antenna, a recognition rate for this may be reduced.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an antenna structure which reduces occurrence of a shadow region with respect to an NFC small tag, and an electronic device including the antenna structure.

Additional aspects will be set forth in part in the description which follows and, in part, will be apparent from the description, or may be learned by practice of the presented embodiments.

In accordance with an aspect of the disclosure, an antenna structure is provided. The antenna structure includes a Printed Circuit Board (PCB) including a first substrate layer and a second substrate layer. The first substrate layer may include a first non-conductive area, a second non-conductive area adjacent to the first non-conductive area, at least one first conductive wire constructed in a shape surrounding the first non-conductive area except for at least a portion adjacent to the second non-conductive area, at least one second conductive wire constructed in a shape surrounding the second non-conductive area except for at least a portion adjacent to the first non-conductive area, and a first antenna corresponding to a first frequency band and constructed in a designated shape in the first non-conductive area or the second non-conductive area, traversing between the at least one first conductive wire and the at least one second conductive wire. The second substrate layer may include a third non-conductive area facing at least part of the first non-conductive area and second non-conductive area, a third wire surrounding the third non-conductive area and constructed with a first winding, and at least one connection wire to electrically couple the at least one first conductive wire and the at least one second conductive wire so that the at least one first conductive wire and the at least one second conductive wire are constructed with a second winding. The first winding and the second winding may be constructed as a second antenna corresponding to a second frequency band through a through-hole which provides electrical coupling between the first winding and the second winding.

In accordance with another aspect of the disclosure, another antenna structure is provided. The antenna structure includes a PCB including a first substrate layer and a second substrate layer. The first substrate layer may include a first non-conductive area, at least one first conductive wire constructed in a shape surrounding the first non-conductive area and disposed such that one end and the other end face each other and are spaced apart from each other, and a first antenna corresponding to a first frequency band and constructed in a designated shape in the first non-conductive area, traversing between one end and the other end of the at least one first conductive wire. The second substrate layer may include a second non-conductive area facing at least part of the first non-conductive area, at least one second conductive wire surrounding the second non-conductive area and constructed with a first winding, and at least one connection wire to electrically couple one end and the other end of the at least one first conductive wire so that the one end of the at least one first conductive wire is constructed with a second winding. The first winding and the second winding may be constructed as a second antenna corresponding to a second frequency band through a through-hole which provides electrical coupling between the first winding and the second winding.

In accordance with another aspect of the disclosure, an electronic device is provided. The electronic device includes a housing including a first plate facing a first direction and a second plate facing a second direction facing away from the first direction, a display disposed to be at least partially exposed to the outside through at least part of the first plate, a PCB disposed between the first plate and the second plate, a support structure to support the display in the first direction and supports the PCB in the second direction, and an antenna disposed between the support structure and the second plate. The antenna may include a first Flexible Printed Circuit Board (FPCB) and a second FPCB which are compressed with each other. The first FPCB may include a first non-conductive area, a second non-conductive area adjacent to the first non-conductive area, at least one first conductive pattern constructed in a shape surrounding the first non-conductive area, and at least one second conductive pattern constructed in a shape surrounding the second non-conductive area. The second FPCB may include a third non-conductive area facing at least part of the first non-conductive area and second non-conductive area, third conductive patterns surrounding the third non-conductive area and constructed with a first winding, and at least one connection pattern constructed to be isolated from the third conductive patterns and providing electrical coupling between the at least one first conductive pattern and the at least one second conductive pattern.

In accordance with aspects of the disclosure, the disclosure improves performance of a Near Field Communication (NFC) antenna by constructing a pattern for NFC in an inner center region of a pattern for a wireless charging pad.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the disclosure may include at least one of, for example, a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device (e.g., smart glasses, a Head-Mounted Display (HMD), electronic clothes, an electronic bracelet, an electronic necklace, an electronic appcessory, an electronic tattoo, a smart mirror, or a smart watch).

Figure 1:
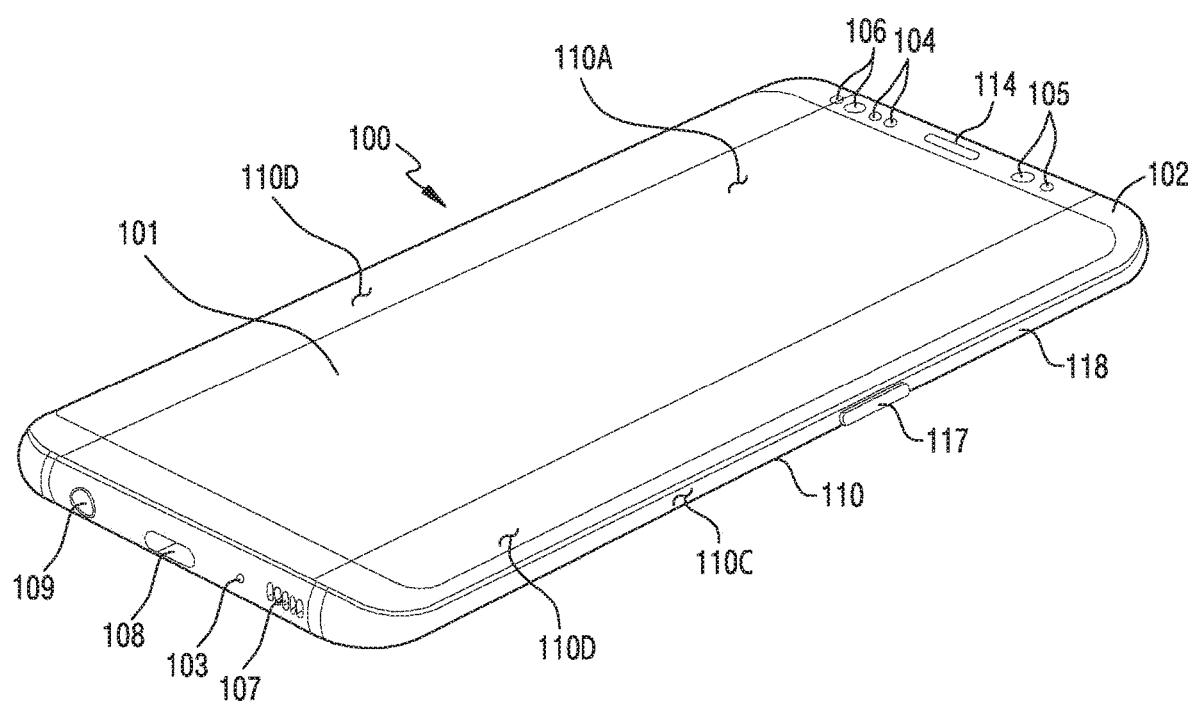
FIG. 1 is a perspective view illustrating a front face of a mobile electronic device according to an embodiment of the disclosure.

FIG. 1 is a perspective view illustrating a front face of a mobile electronic device according to an embodiment of the disclosure.

Figure 2:
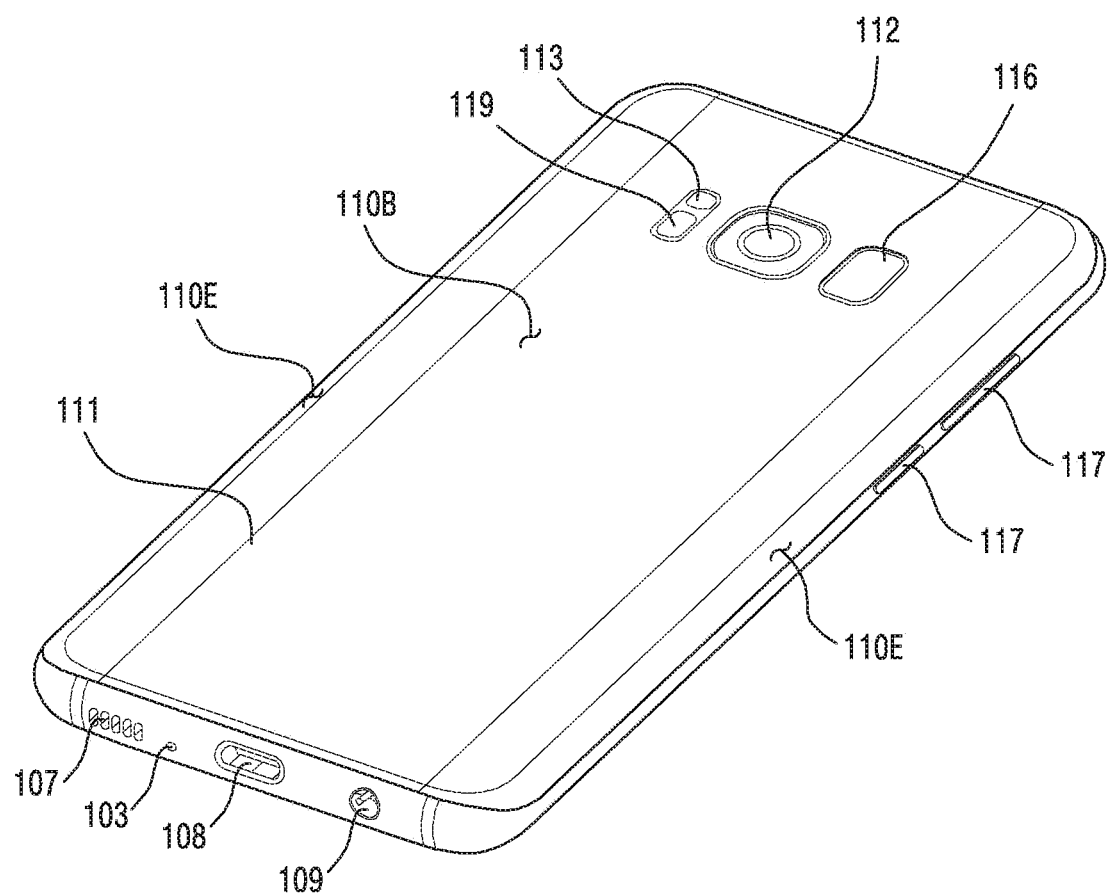
FIG. 2 is a perspective view illustrating a rear face of the electronic device of FIG. 1 according to an embodiment of the disclosure.

FIG. 2 is a perspective view illustrating a rear face of the electronic device of FIG. 1 according to an embodiment of the disclosure.

Referring to FIGS. 1 and 2, an electronic device 100 according to an embodiment may include a housing 110 including a first face (or a front face) 110A, a second face (or a rear face) 110B, and a lateral face 110C surrounding a space between the first face 100A and the second face 110B. In another embodiment (not shown), the housing may refer to a construction which constitutes part of the first face 110A, second face 110B, and third face 110C of FIG. 1. According to an embodiment, the first face 110A may be constructed of a front plate 102 (e.g., a polymer plate or a glass plate having various coating layers) which is at least partially transparent in practice. The second face 110B may be constructed of a rear plate 111 which is opaque in practice. For example, the rear plate 111 may be constructed of coated or colored glass, ceramic, polymer, metallic materials (e.g. aluminum, stainless steel (STS), or magnesium) or a combination of at least two of these materials. The lateral face 110C may be constructed of a lateral bezel structure (or a lateral member) 118 bonded to the front plate 102 and the rear plate 111 and including metal and/or polymer. In some embodiments, the rear plate 111 and the lateral bezel structure 118 may be constructed integrally and may include the same material (e.g., a metallic material such as aluminum).

In the illustrated embodiment, the front plate 102 may include two first regions 110D seamlessly extended by being bent from the first face 110A toward the rear plate 111 at both ends of a long edge of the front plate 102. In the illustrated embodiment (see FIG. 2), the rear plate 111 may include two second regions 110E seamlessly extended by being bent from the second face 110B toward the front plate 102 at both ends of a long edge. In some embodiments, the front plate 102 (or the rear plate 111) may include only one of the first regions 110D (or the second regions 110E). In another embodiment, some of the first regions 110D or the second regions 110E may not be included. In the above embodiments, in a lateral view of the electronic device 100, the lateral bezel structure 118 may have a first thickness (or width) at a lateral face in which the first regions 110D or the second regions 110E are not included, and may have a second thickness thinner than the first thickness at a lateral face in which the first regions 110E or the second regions 110E are included.

According to an embodiment, the electronic device 100 may include at least one or more of a display 101, audio modules 103, 107, and 114, sensor modules 104, 116, and 119, camera modules 105, 112, and 113, a key input device 117, a light emitting element 106, and connector holes 108 and 109. In some embodiments, the electronic device 100 may omit at least one of components (e.g., the key input device 117 or the light emitting element 106), or other components may be additionally included.

The display 101 may be exposed through, for example, some portions of the front plate 102. The display 101 may be disposed to be at least partially exposed to the outside through at least part of the front plate 102. In some embodiments, at least part of the display 101 may be exposed through the first face 110A and the front plate 102 constructing the first regions 110E of the lateral face 110C. In some embodiments, a corner of the display 101 may be constructed to be substantially the same as an outer boundary adjacent to the front plate 102. In another embodiment (not shown), in order to expand an area in which the display 101 is exposed, the display 110 and the front plate 102 may be constructed to have substantially the same interval between outer boundaries thereof.

In another embodiment (not shown), a portion of a screen display region of the display 101 may have a recess or opening, and may include at least one or more of the audio module 114, sensor module 104, camera module 105, and light emitting element 106 which are aligned with the recess or the opening may be included. In another embodiment (not shown), at least one of the audio module 114, the sensor module 104, the camera module 105, the fingerprint sensor 116, and the light emitting element 106 may be included in a rear face of the screen display region of the display 101. In another embodiment (not shown), the display 101 may be disposed adjacent to or joined with a touch sensing circuit, a pressure sensor capable of measuring touch strength (pressure), and/or a digitizer for detecting a magnetic-type stylus pen. In some embodiments, at least part of the sensor modules 104 and 119 and/or at least part of the key input device 117 may be disposed to the first regions 110D and/or the second regions 110E.

The audio modules 103, 107, and 114 may include the microphone hole 103 and the speaker holes 107 and 114. The microphone hole 103 may have a microphone disposed inside thereof to acquire external sound, and in some embodiments, may have a plurality of microphones disposed to sense a sound direction. The speaker holes 107 and 114 may include the external speaker hole 107 and the communication receiver hole 114. In some embodiments, the speaker holes 107 and 114 and the microphone hole 103 may be implemented with one hole, or the speaker may be included without the speaker holes 107 and 114 (e.g., a Piezo speaker).

The sensor modules 104, 116, and 119 may generate an electrical signal or data value corresponding to an internal operational state of the electronic device 100 or an external environmental state. The sensor modules 104, 116, and 119 may include, for example, the first sensor module 104 (e.g., a proximity sensor) and/or second sensor module (not shown) (e.g., a fingerprint sensor) disposed to the first face 110A of the housing 110, and/or the third sensor module 119 (e.g., a Heart Rate Monitoring (HRM) sensor) disposed to the second face 110B of the housing 110 and/or the fourth sensor module 116 (e.g., a fingerprint sensor). The fingerprint sensor may be disposed not only to the first face 110A (e.g., the display 101) but also the second face 110B of the housing 110. The electronic device 100 may further include at least one of sensor modules (not shown), for example, a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, and an illuminance sensor.

The camera modules 105, 112, and 113 may include the first camera device 105 disposed to the first face 110A of the electronic device 100, the second camera device 112 disposed to the second face 110B, and/or the flash 113. The camera module 105 and 112 may include one or more lenses, an image sensor, and/or an image signal processor. The flash 113 may include, for example, a Light Emitting Diode (LED) or a xenon lamp. In some embodiments, two or more lenses (wide angle and telephoto lenses) and image sensors may be disposed to one face of the electronic device 100.

The key input device 117 may be disposed to the lateral face 110C of the housing 110. In another embodiment, the electronic device 100 may not include the entirety or part of the aforementioned key input device 117. The key input device 117, which is not included, may be implemented on a display 101 in a different form such as a soft key or the like. In some embodiments, the key input device may include the sensor module 116 disposed to the second face 110B of the housing 110.

The light emitting element 106 may be disposed, for example, to the first face 110A of the housing 110. The light emitting element 106 may provide, for example, state information of the electronic device 100 in an optical form. In another embodiment, the light emitting element 106 may provide, for example, a light source interworking with an operation of the camera module 105. The light emitting element 106 may include, for example, an LED, an IR LED, and a xenon lamp.

The connector holes 108 and 109 may include the first connector hole 108 capable of housing a connector (e.g., a Universal Serial Bus (USB) connector) for transmitting/receiving power and/or data of an external electronic device and/or the second connector hole (e.g., earphone jack) 109 capable of housing a connector for transmitting/receiving an audio signal with respect to the external electronic device.

Figure 3:
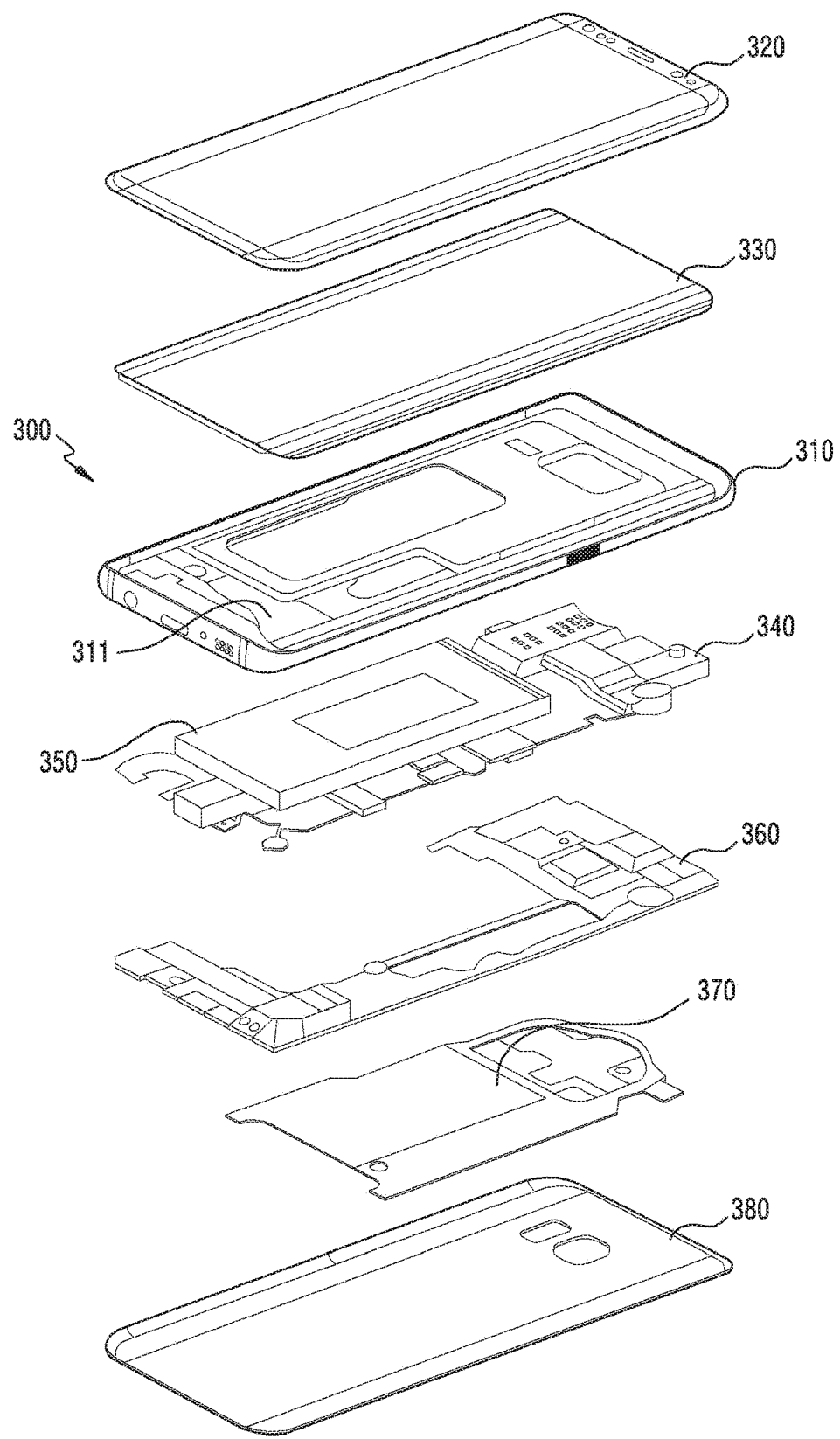
FIG. 3 is an exploded perspective view illustrating an inner structure of the electronic device of FIG. 1 according to an embodiment of the disclosure.

FIG. 3 is an exploded perspective view illustrating an inner structure of the electronic device of FIG. 1 according to an embodiment of the disclosure.

Referring to FIG. 3, an electronic device 300 may include a lateral bezel construction 310, a first support member 311 (e.g., a bracket), a front plate 320, a display 330, a Printed Circuit Board (PCB) 340, a battery 350, a second support member 360 (e.g., a rear case), an antenna 370, and a rear plate 380. In some embodiments, the electronic device 300 may omit at least one (e.g., the first support member 311) of these components, or may additionally include other components. At least one of the components of the electronic device 300 may be the same as or similar to at least one of the components of the electronic device 100 of FIG. 1 or FIG. 2, and redundant descriptions will be omitted hereinafter.

The first support member 311 may be coupled with the lateral bezel construction 310 by being disposed inside the electronic device 300, or may be constructed integrally with respect to the lateral bezel construction 310. The first support member 311 may be constructed of, for example, a metal material and/or non-metal material (e.g., polymer). The display 330 may be coupled to one side of the first support member 311, and the PCB 340 may be coupled to the other side thereof. A processor, a memory, and/or an interface may be mounted on the PCB 340. The processor may include, for example, one or more of a central processing unit, an application processor, a graphic processing unit, an image signal processor, a sensor hub processor, and a communication processor.

The memory may include, for example, a volatile memory or a non-volatile memory.

The interface may include, for example, a High Definition Multimedia Interface (HDMI), a Universal Serial Bus (USB) interface, a Secure Digital (SD) card interface, and/or an audio interface. For example, the interface may electrically or physically couple the electronic device 300 and the external electronic device, and may include a USB connector, an SD card/MMC connector, or an audio connector.

As a device for supplying power to at least one component of the electronic device 300, the battery 350 may include, for example, a non-rechargeable primary cell, a rechargeable secondary cell, or a fuel cell. At least one portion of the battery 350 may be disposed on the same plane substantially with respect to, for example, the PCB 340. The battery 350 may be disposed integrally inside the electronic device 300, or may be detachably disposed with respect to the electronic device 300.

The antenna 370 may be disposed between the rear plate 380 and the battery 350. The antenna 370 may include, for example, a Near Field Communication (NFC) antenna, a wireless charging antenna, and/or a Magnetic Secure Transmission (MST) antenna. The antenna 370 may perform NFC, for example, with the external electronic device, or may wirelessly transmit/receive power required for charging. In another embodiment, an antenna construction may be constructed by at least part of the lateral bezel construction 310 and/or the first support member 311 or a combination thereof.

Hereinafter, a configuration of an antenna structure mounted on an electronic device will be described according to various embodiments of the disclosure with reference to the accompanying drawing.

Figure 4A:
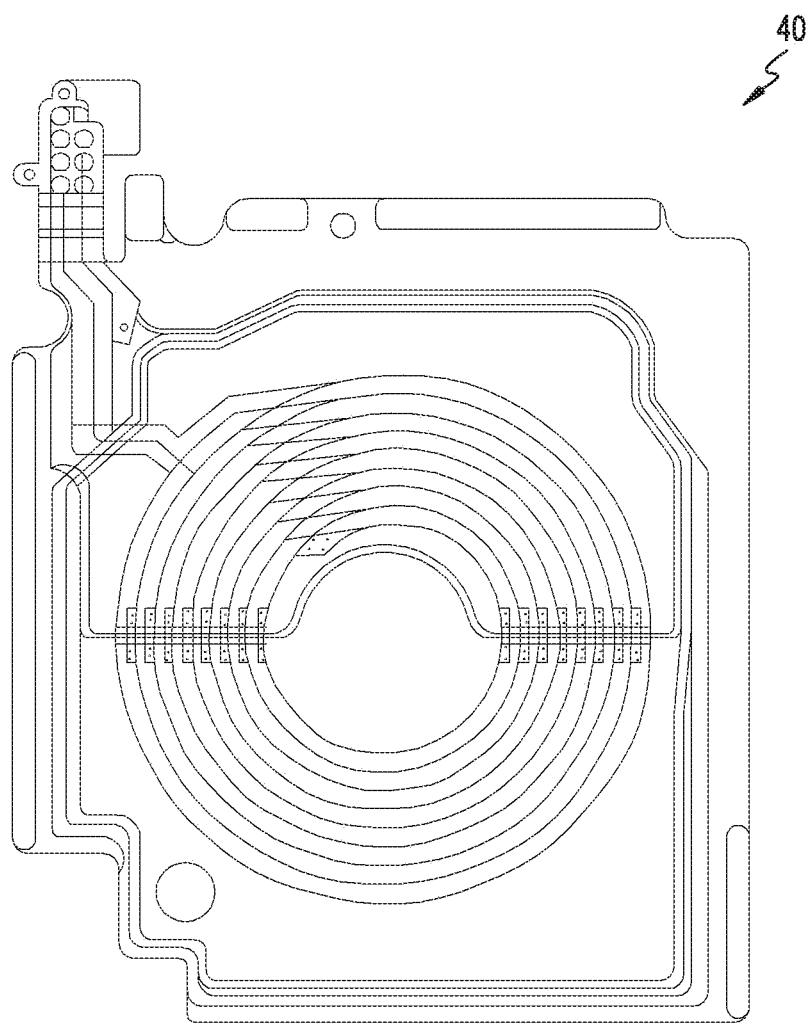
FIG. 4A is a plan view illustrating an antenna structure according to an embodiment of the disclosure.

FIG. 4A is a plan view illustrating an antenna structure according to an embodiment of the disclosure.

Figure 4B:
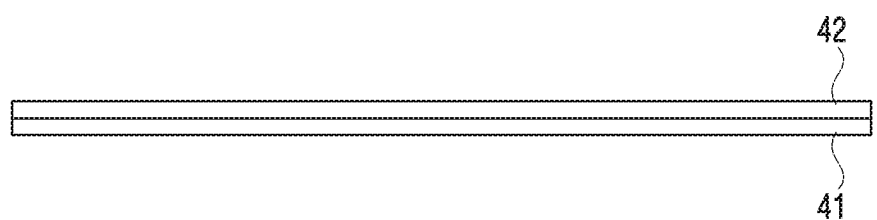
FIG. 4B is a lateral view illustrating an antenna structure according to an embodiment of the disclosure.

FIG. 4B is a lateral view illustrating an antenna structure according to an embodiment of the disclosure.

Referring to FIGS. 4A and 4B, as an antenna mounted on an electronic device (e.g., the electronic device 100 of FIG. 1), an antenna structure 40 (e.g., the antenna 370 of FIG. 3) according to various embodiments may be used, for example, as a wireless charging pad or an NFC antenna. According to an embodiment, the antenna structure 40 may include at least one conductor. For example, the at least one conductor may include a coil body or any one of a conductive wire and a conductive pattern or a combination thereof. The coil body may be disposed for wireless charging, and the conductive wire or the conductive pattern or the like may be disposed as a radiator for NFC.

According to an embodiment, the antenna structure 40 may be disposed between a rear case (e.g., a battery or support structure housed in the rear case) of the electronic device and a second plate (e.g., a back cover or a back glass) (e.g., the rear plate 111 of FIG. 2).

According to an embodiment, the antenna structure 40 may include a PCB including a first substrate layer 41 and a second substrate layer 42. For instance, each of the first and second substrate layers 41 and 42 is a film type and may be constructed of a flexible material. The first substrate layer 41 may include a first Flexible Printed Circuit Board (FPCB), and the second substrate layer may include a second FPCB. According to an embodiment, the first and second substrate layers 41 and 42 may be compressed and constructed as one PCB. For example, the first substrate layer 41 may be disposed to a lower portion, and the second substrate layer 42 may be disposed above the first substrate layer 41. According to an embodiment, the first and second substrate layers 41 and 42 may be electrically coupled with each other due to a conductive structure. For instance, the conductive structure may use a through-hole or via-hole filled with a conductive material.

Figure 5:
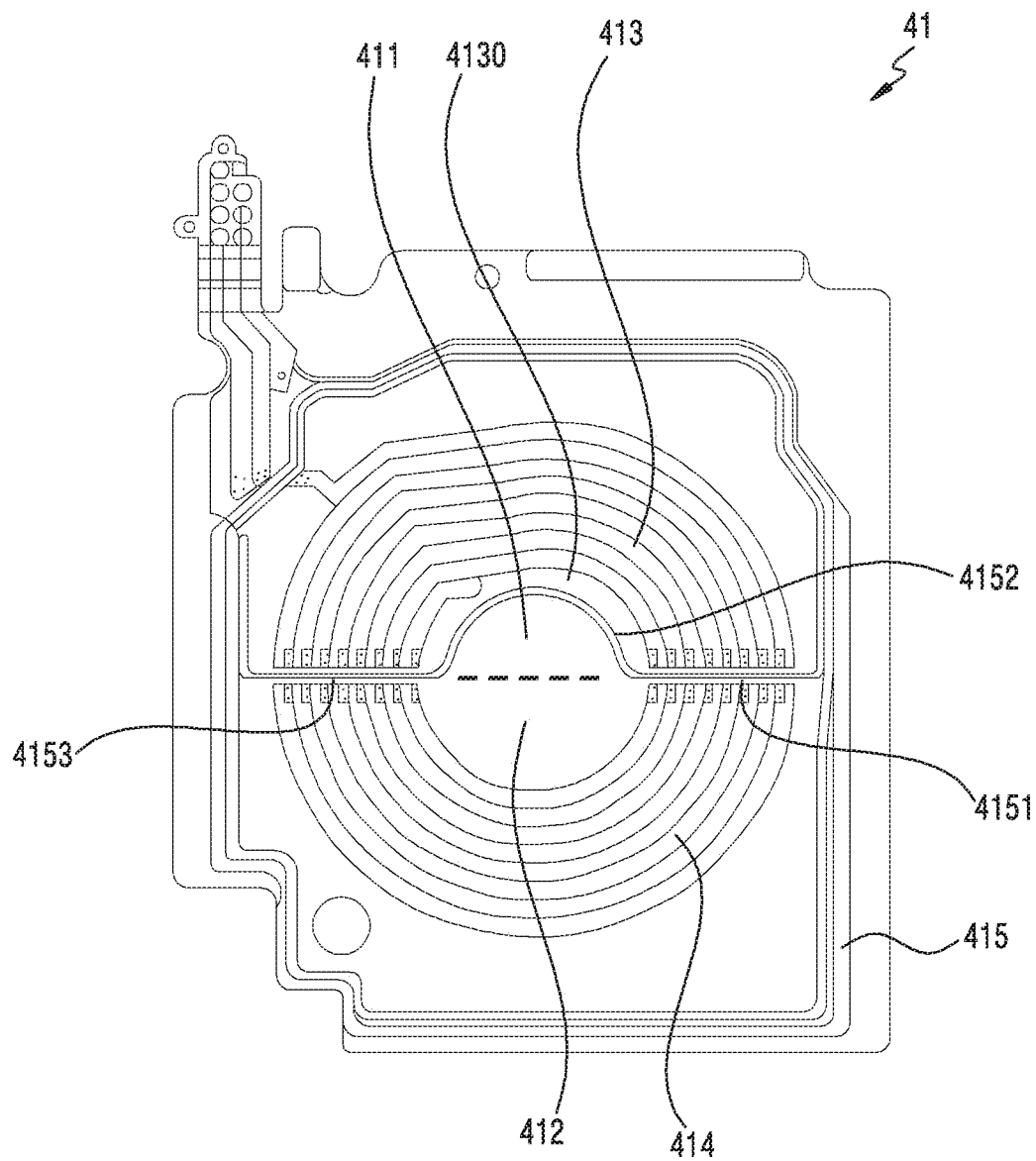
FIG. 5 is a plan view illustrating a first substrate layer according to an embodiment of the disclosure.

FIG. 5 is a plan view illustrating a first substrate layer according to an embodiment of the disclosure.

Referring to FIG. 5, the first substrate layer 41 according to an embodiment may be a conductive member having a conductor, for example, a wire or a pattern or the like, disposed on a layer of a film material. For example, the conductor may have at least one coil body or at least one conductive pattern or at least one conductive wire, disposed on an insulation layer. According to an embodiment, the conductor may be protected by the insulation layer (e.g., a protection layer).

According to an embodiment, the first substrate layer 41 may include at least one of conductive wires 413 and 414 and a first antenna 415. For instance, at least one conductive of wires 413 and 414 may be disposed inside the first antenna 415. The first antenna 415 may be extended along a periphery of the at least one of conductive wires 413 and 414. The first antenna 415 and the at least one of conductive wires 413 and 414 may be spaced apart from each other by means of an insulation material. According to an embodiment, the first antenna 415 may be constructed of a conductive pattern having a substantially closed curve shape.

According to an embodiment, the first substrate layer 41 may include a first non-conductive area 411, a second non-conductive area 412, the first conductive wires 413, the second conductive wires 414, and the first antenna 415. According to an embodiment, the second non-conductive area 412 may be disposed adjacent to the first non-conductive area 411. The first and second non-conductive areas 411 and 412 may face each other. According to an embodiment, the first conductive wires 413 may be constructed in a shape of surrounding the first non-conductive area 411 except for at least part of a portion adjacent to the second non-conductive area 412. According to an embodiment, the second conductive wires 414 may be constructed in a shape of surrounding the second non-conductive area 412 except for at least part of a portion adjacent to the first non-conductive area 411. The first and second conductive wires 413 and 414 may face each other. The first and second non-conductive areas 411 and 412 may have a substantially circular shape together, and the first and second conductive wires 413 and 414 may have a ring shape together. However, without being limited to these shapes, the first and second non-conductive areas 411 and 412 may have various shapes together, and the first and second non-conductive wires 413 and 414 may have various shapes together. For instance, the various shapes may include an oval or polygonal shape or the like.

According to an embodiment, the first and second conductive wires 413 and 414 may face each other and may be spaced apart from each other.

According to an embodiment, the first antenna 415 may be a conductive pattern constructed on an insulation layer of a film material. The first antenna 415 may be disposed in a shape of surrounding the first and second conductive wires 413 and 414. In addition, the first antenna 415 may be constructed in a designated shape in the first non-conductive area 411 or the second non-conductive area 412, traversing between the first and second conductive wires 413 and 414, thereby corresponding to a first frequency band.

In a conductive pattern of the first antenna 415 according to an embodiment, the conductive pattern traversing between the first and second conductive wires 413 and 414 may include a first linear-shaped conductive pattern 4151 located at one side between the first and second conductive wires 413 and 414, a curved-shaped conductive pattern 4152 constructed in the first non-conductive area 411 or the second non-conductive area 412, and a linear-shaped pattern 4153 located at the other side between the first and second conductive wires 413 and 414. For instance, the curved shape includes a semi-circular shape, but without being limited to these shapes, various shapes, such as a linear shape, a spiral shape, or the like, may also be possible.

According to an embodiment, the first and second linear-shaped conductive patterns 4151 and 4153 may be constructed in a state of being spaced apart respectively from the first and second conductive wires 413 and 414. In addition, the curved-shaped conductive pattern 4152 may be constructed in a state of being spaced apart from the first and second conductive wires 413 and 414. For instance, the curved-shaped conductive pattern 4152 may be constructed to be in proximity to the wire 4130 located at an innermost side of the first conductive wires 413 with an interval in in the first non-conductive area 411.

Figure 6:
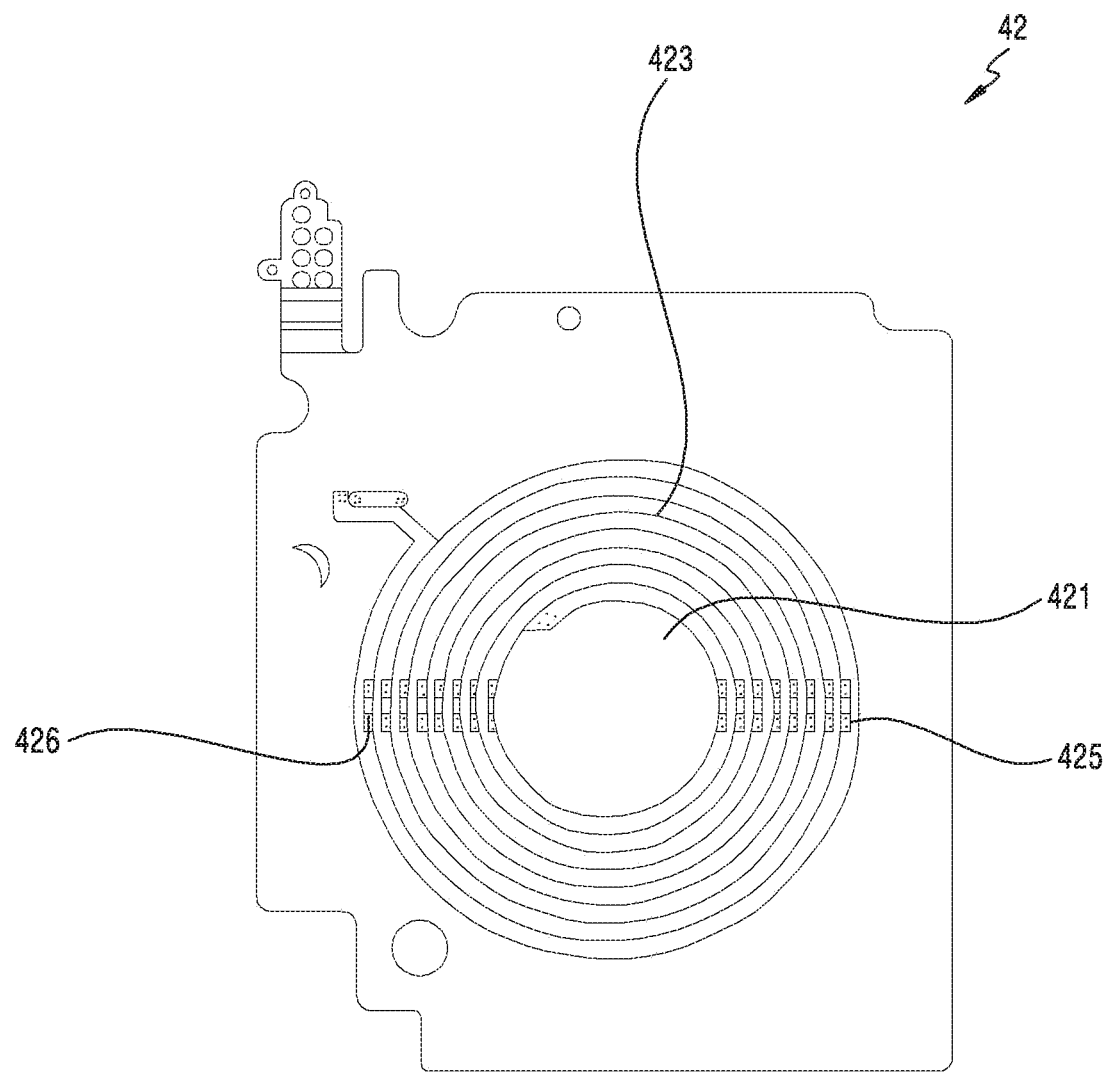
FIG. 6 is a plan view illustrating a second substrate layer according to an embodiment of the disclosure.

FIG. 6 is a plan view illustrating a second substrate layer according to an embodiment of the disclosure.

Referring to FIG. 6, the second substrate layer 42 according to an embodiment may be a conductive member having a conductor disposed on a film material. For example, the conductor may have at least one coil body or at least one conductive pattern or at least one conductive wire, disposed on an insulation layer. According to an embodiment, the conductor may be protected by the insulation layer (e.g., a protection layer).

According to an embodiment, the second substrate layer 42 may include a third non-conductive area 421, third conductive wires 423, and at least one connection wire 427.

According to an embodiment, the third non-conductive area 421 may face part of the first non-conductive area 411 and part of the second non-conductive area 412. For instance, the third non-conductive area 421 may have a substantially circular shape. According to an embodiment, the third non-conductive area 421 may be surrounded by the third conductive wires 423.

In an embodiment, the third conductive wires 423 may be constructed in a shape of surrounding the third non-conductive area 421, and may be constructed with a first winding.

According to an embodiment, the connection wires 427 may include a first connection wire 425 for electrically coupling one end of first conductive wires (e.g., the first conductive wires 413 of FIG. 5) and one end of second conductive wires (e.g., the second conductive wires 414 of FIG. 5), and a second connection wire 426 which electrically couples the other end of the first conductive wires and the other ends of the second conductive wires.

According to an embodiment, at least one connection wire 427 may provide electrical coupling between the at least one first conductive wire and the at least one second conductive wire so that at least one first conductive wire (e.g., the first conductive wires 413 of FIG. 5) and at least one second conductive wire (e.g., the second conductive wires 414 of FIG. 5) are constructed with a second winding. The connection wires 427 may be constructed in a state of being spaced apart from the respective wires.

According to an embodiment, each of the first and second connection wires 425 and 426 may be arranged in a direction traversing the third conductive wires 423. For instance, each of the first and second wires 425 and 426 may be arranged linearly in a direction traversing the third conductive wire 423. For instance, each of the first and second wires 425 and 426 may be constructed as conductive patterns.

Figure 7:
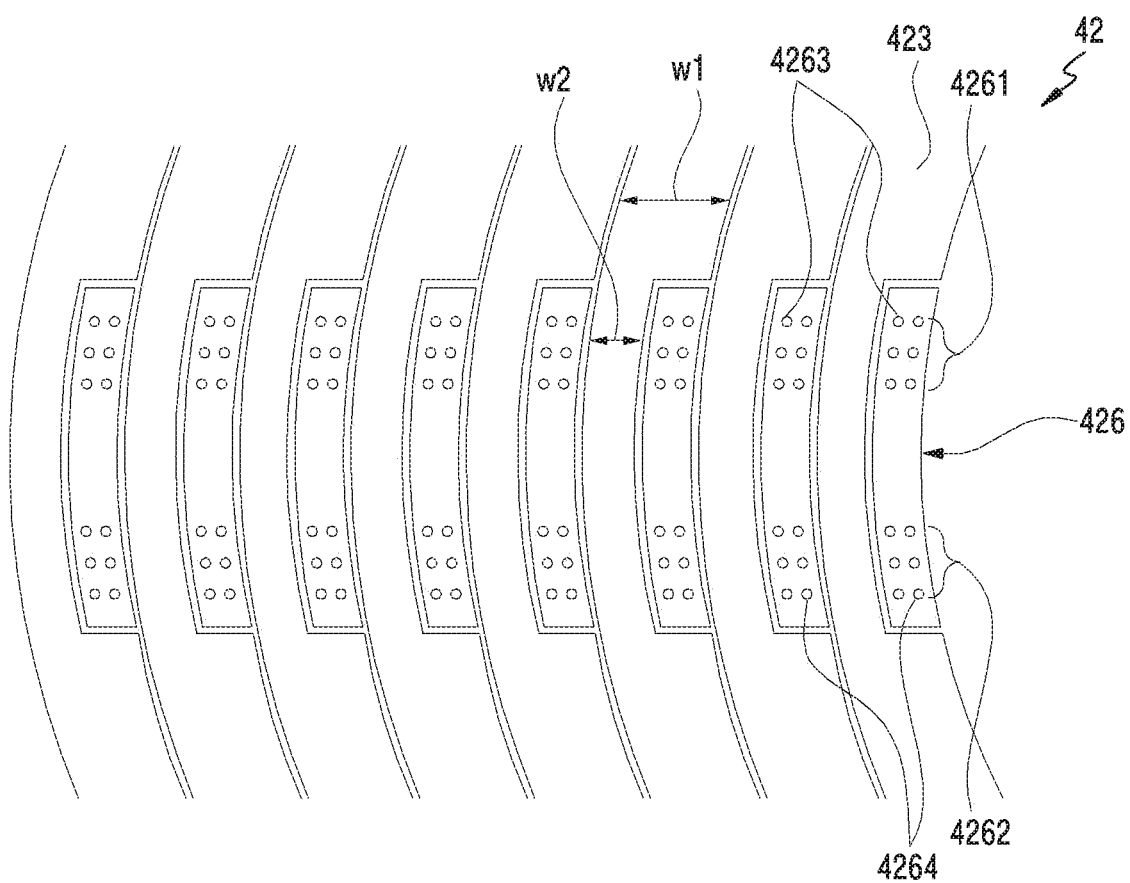
FIG. 7 is a plan view illustrating connection wires according to an embodiment of the disclosure.

FIG. 7 is a plan view illustrating connection wires according to an embodiment of the disclosure.

Referring to FIG. 7, according to an embodiment, the second substrate layer 42 includes the first and second connection wires 425 and 426. The second connection wire 426 will be taken for example in the following description. The second connection wires 426 may be constructed respectively on the third conductive wires 423. The second connection wire 426 may be extended along a lengthwise direction in which the wire is extended. The second connection wires 426 may be constructed in a state of being spaced apart from the respective wires. The wire may be constructed in such a manner that a width w2 of a portion where the second connection wire 426 is constructed is less than a width w1 of the remaining portions. The wires may be spaced apart from each other, and the second connection wires 426 constructed on the respective wires may be constructed in a state of being spaced apart from the respective wires. In addition, the connection wires may be disposed in a state of being spaced apart from each other.

In an embodiment, the second connection wire 426 may have at least one of via-holes 4261 and 4262. According to an embodiment, the plurality of via-holes 4261 and 4262 may be aligned along the second connection wire 426. For instance, the via-holes 4261 and 4262 may have a circular shape. The via-hole according to an embodiment may include the first via-hole 4261 electrically coupled with first conductive wires (e.g., the first conductive wires 413 of FIG. 5) and the second via-hole 4262 electrically coupled with second conductive wires (e.g., the second conductive wires 414 of FIG. 5). The first via-hole 4261 may include at least one of via-holes 4263, and the second via-hole 4262 may include at least one of via-holes 4264. For instance, any of the via-holes may be filled with a conductive material to construct first and second conductive structures.

Figure 8:
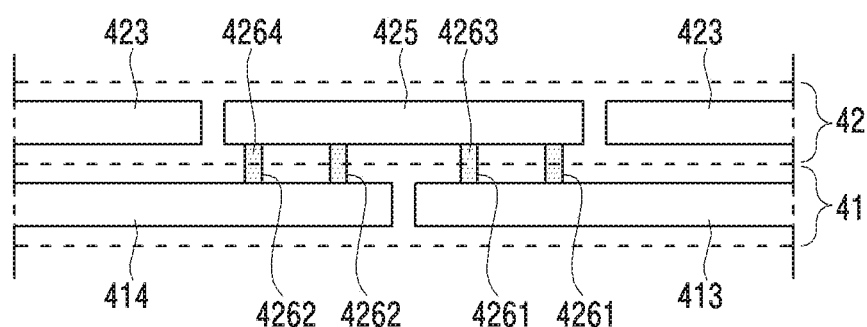
FIG. 8 is a cross-sectional view illustrating a state where first and second conductive wires are electrically coupled by means of connection wires according to an embodiment of the disclosure.

FIG. 8 is a cross-sectional view illustrating a state where first and second conductive wires are electrically coupled by means of connection wires according to an embodiment of the disclosure.

Referring to FIG. 8, between first and second connection wires (e.g., the first and second connection wires 425 and 426 of FIG. 6) according to various embodiments, a conductive structure of the first connection wire 425 will be taken for example in the following description. The first connection wire 425 may electrically couple first and second conductive wires (e.g., the first and second conductive wires 413 and 414 of FIG. 5). The first connection wire 425 may have the first and second via-holes 4261 and 4262. The first via-hole 4261 may be electrically coupled with first conductive wires (e.g., the first conductive wires 413 of FIG. 5). The second via-hole 4262 may be electrically coupled with second conductive wires (e.g., the second conductive wires 414 of FIG. 5). According to an embodiment, the first connection wire 425 may be coupled with first and second conductive wires (e.g., the first and second conductive wires 413 and 414 of FIG. 5) in a series type.

According to an embodiment, the first via-hole 4261 may be filled with a conductive material to construct a first conductive structure 4263, and the second via-hole 4262 may be filled with a conductive material to construct a second conductive structure 4264. The first connection wire 425 may be electrically coupled with the first conductive wires by means of the first conductive structure 4263, and the second connection wire 425 may be electrically coupled with the second conductive wires 414 by means of the second conductive structure 4264. According to an embodiment, the first and second conductive wires may construct a second winding by means of the first and second conductive structures 4263 and 4264.

According to an embodiment, the first and second windings may construct a second antenna corresponding to a second frequency band through a via-hole (e.g., the first and second via-holes 425 and 426) which electrically penetrates through between the first and second windings. For instance, the via-hole (e.g., the first and second via-holes 425 and 426 of FIG. 6) may be referred to as a through-hole.

Figure 9:
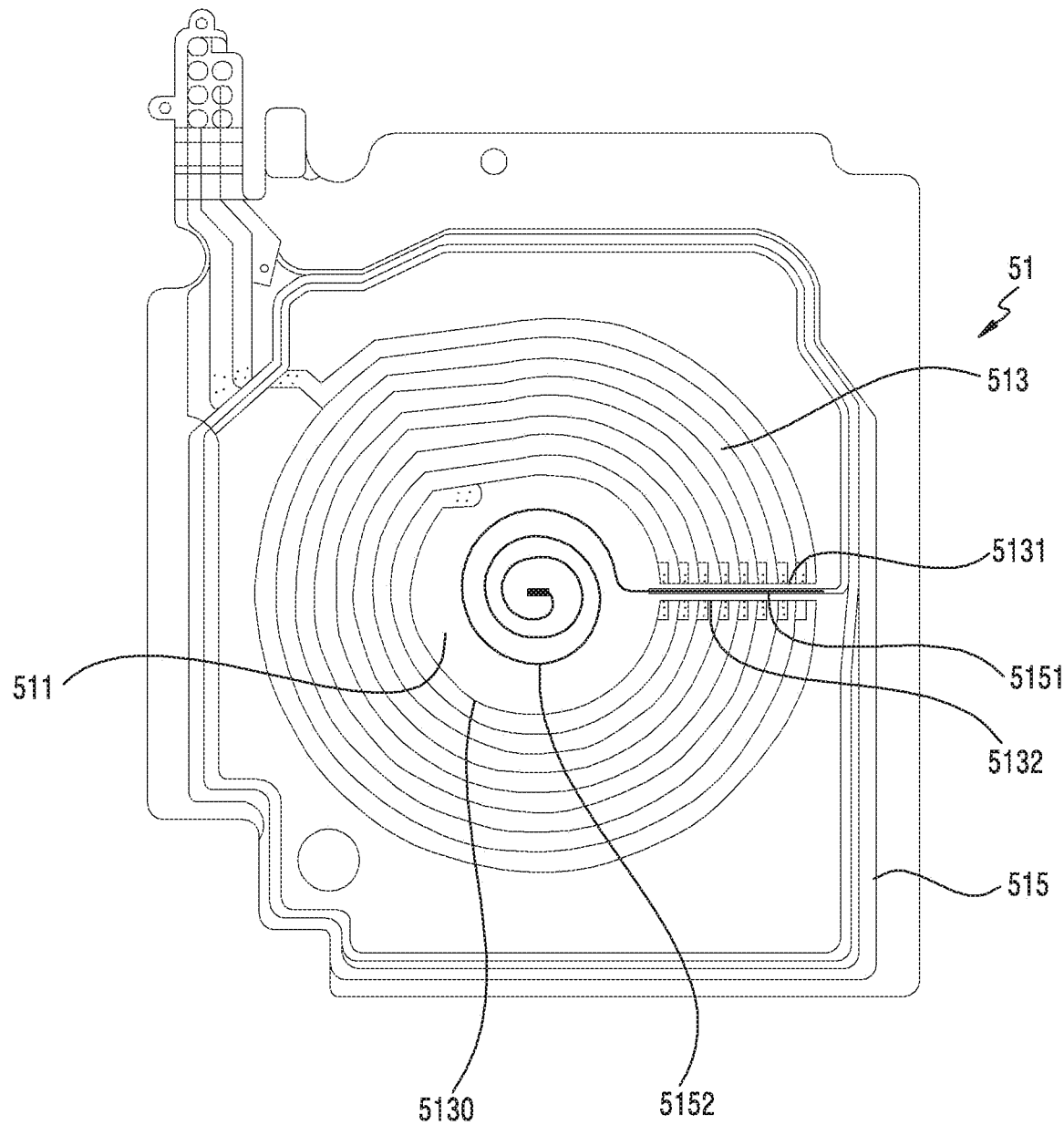
FIG. 9 is a plan view illustrating another first substrate layer according to an embodiment of the disclosure.

FIG. 9 is a plan view illustrating another first substrate layer according to an embodiment of the disclosure.

Referring to FIG. 9, a first substrate layer 51 according to an embodiment may be a conductive member having a conductor disposed on a film material. For example, the conductor may have at least one coil body or at least one conductive pattern or at least one conductive wire, disposed on an insulation layer. According to an embodiment, the conductor may be protected by the insulation layer (e.g., a protection layer).

According to an embodiment, the first substrate layer 51 may include a non-conductive area 511, at least one conductive wire 513, and a first antenna 515. For instance, at least one conductive wire 513 may be disposed inside the first antenna 515. The first antenna 515 may be extended along a periphery of the at least one conductive wire 513. The first antenna 515 and the at least one conductive wire 513 may be spaced apart from each other by means of an insulation material.

According to an embodiment, the first antenna 515 may be a conductive pattern constructed on an insulation layer of a film material. The first antenna 515 may be disposed in a shape of surrounding the conductive wires 513. In addition, the first antenna 515 may be constructed in a designated shape in the non-conductive area 511, traversing between one end 5131 and the other end 5132 of one conductive wire, thereby corresponding to a third frequency band.

In a conductive pattern of the first antenna 515 according to an embodiment, the conductive pattern traversing between one end 5131 and the other end 5132 of the conductive wires may include a linear-shaped conductive pattern 5151 located between one end 5131 and the other end 5132 of the conductive wires and a curved-shaped conductive pattern 5152 constructed on the non-conductive area 511. For instance, the curved shape includes a coil shape (e.g., a spiral shape), but without being limited to these shapes, various shapes, such as a circular, semi-circular, or linear shape may also be possible.

According to an embodiment, the linear-shaped conductive pattern 5151 may be constructed in a state of being spaced apart from one end 5131 and the other end 5132 of the conductive wires. In addition, the curved-shaped pattern 5152 may be constructed in a state of being spaced apart from the conductive wires 513. For instance, the curved-shaped conductive pattern 5152 may be constructed to be in proximity to a wire 5130 located at an innermost side of the conductive wires with an interval in in the first non-conductive area 511.

Figure 10:
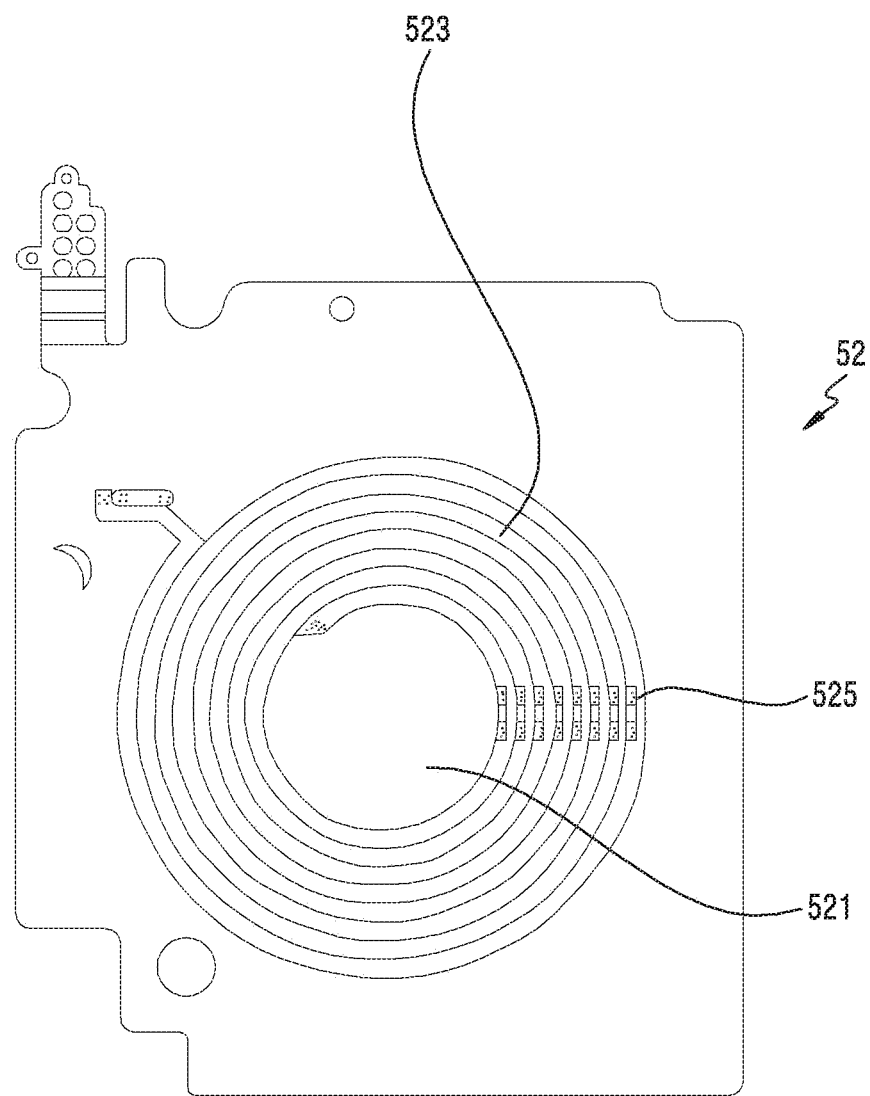
FIG. 10 is a plan view illustrating another second substrate layer according to an embodiment of the disclosure.

FIG. 10 is a plan view illustrating another second substrate layer according to an embodiment of the disclosure.

Referring to FIG. 10, a second substrate layer 52 according to an embodiment may be a conductive member having a conductor disposed on a film material. For example, the conductor may have at least one coil body or at least one conductive pattern or at least one conductive wire, disposed on an insulation layer. According to an embodiment, the conductor may be protected by the insulation layer (e.g., a protection layer).

According to an embodiment, the second substrate layer 52 may include a non-conductive area 521, conductive wires 523, and at least one connection wire 525.

According to an embodiment, the non-conductive area 521 may face part of a non-conductive area (e.g., the non-conductive area 511 of FIG. 9). For instance, the non-conductive area 521 may have a substantially circular shape. According to an embodiment, the non-conductive area 521 may be surrounded by the conductive wires 523.

According to an embodiment, the conductive wires 523 may be constructed in a shape of surrounding the non-conductive area 521. For instance, the conductive wires 523 may construct a first winding.

According to an embodiment, the at least one connection wire 525 may provide electrical coupling between one end and the other end of at least one conductive wire (e.g., one end 5131 and the other end 5132 of the conductive wires of FIG. 9). The connection wires 525 may be constructed in a state of being spaced apart from the respective conductive wires 523. According to an embodiment, the connection wire 525 may be arranged in a direction traversing the conductive wires 523. For instance, the respective connection wires 525 may be arranged linearly in a direction traversing the conductive wires 523. For instance, each of the connection wires 525 may be constructed in a shape of a conductive pattern. A conductive structure (e.g., the first and second conductive structures 4263 and 4264 of FIG. 8) which electrically couples one end and the other end of conductive wires (e.g., one end 5131 and the other end 5132 of the conductive wires of FIG. 9) by means of the connection wire 525 may be constructed to be the same as the conductive structure of FIG. 8.

Figure 11:
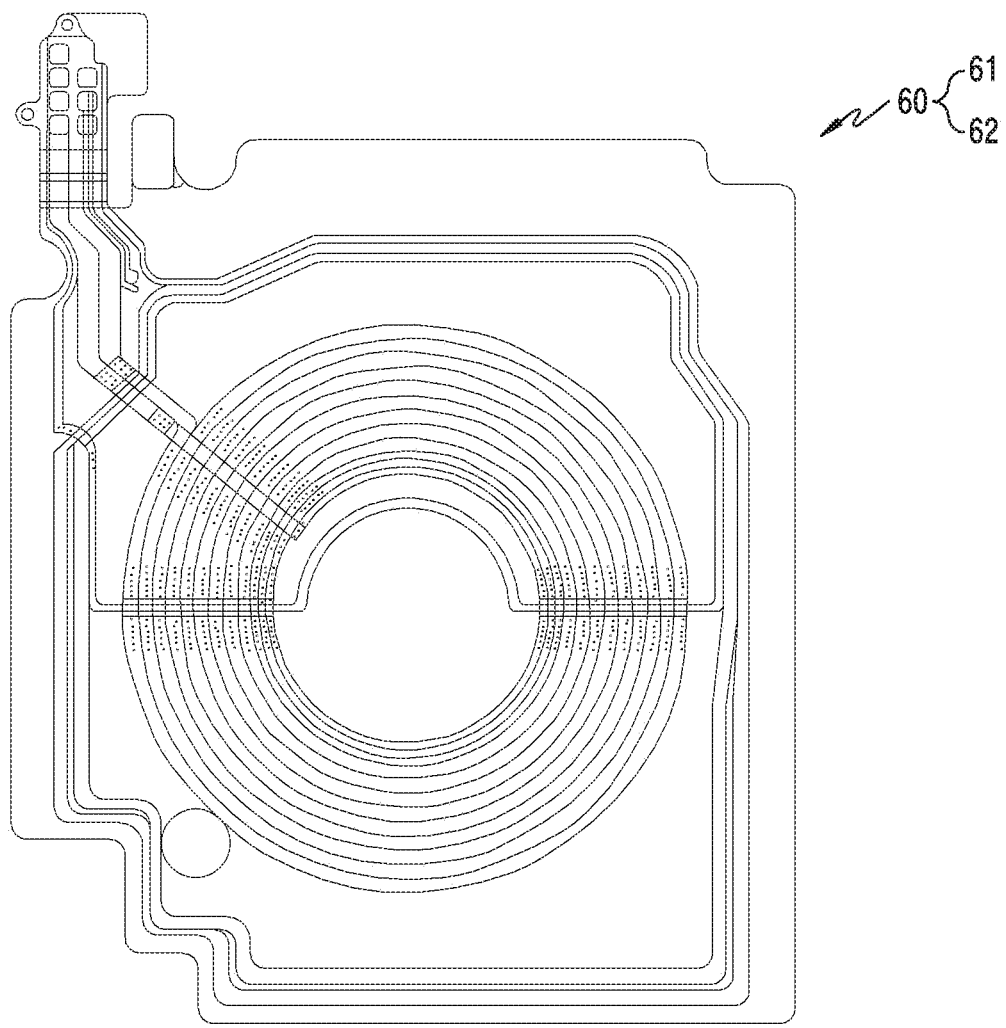
FIG. 11 is a plan view illustrating another antenna structure according to an embodiment of the disclosure.

FIG. 11 is a plan view illustrating another antenna structure according to an embodiment of the disclosure.

Referring to FIG. 11, as an antenna mounted on an electronic device (e.g., the electronic device 100 of FIG. 1), an antenna structure 60 (e.g., the antenna 370 of FIG. 3) according to various embodiments may be used, for example, as a wireless charging pad or an NFC antenna. According to an embodiment, the antenna structure 60 may include at least one conductor. For example, the at least one conductor may include a coil body or any one of a conductive wire and a conductive pattern or a combination thereof. The coil body may be disposed for wireless charging, and the conductive wire or the conductive pattern or the like may be disposed as a radiator for NFC.

According to an embodiment, the antenna structure 60 may be disposed between a rear case (e.g., a battery or support structure housed in the rear case) of the electronic device and a second plate (e.g., a back cover or a back glass) (e.g., the rear plate 111 of FIG. 2).

According to an embodiment, the antenna structure 60 may include a PCB including a first substrate layer 61 and a second substrate layer 62. For instance, each of the first and second substrate layers 61 and 62 is a film type and may be constructed of a flexible material. The first substrate layer 61 may include a first FPCB, and the second substrate layer may include a second FPCB. According to an embodiment, the first and second substrate layers 61 and 62 may be compressed and constructed as one PCB. For example, the first substrate layer 61 may be disposed to a lower portion, and the second substrate layer 62 may be disposed above the first substrate layer 61. According to an embodiment, the first and second substrate layers 61 and 62 may be electrically coupled with each other due to a conductive structure. For instance, the conductive structure may use a through-hole or via-hole filled with a conductive material.

According to an embodiment, in an antenna structure, the first and second substrate layers 61 and 62 may be electrically coupled in a parallel type by using a conductive structure, for example, at least one via-hole.

Figure 12A:
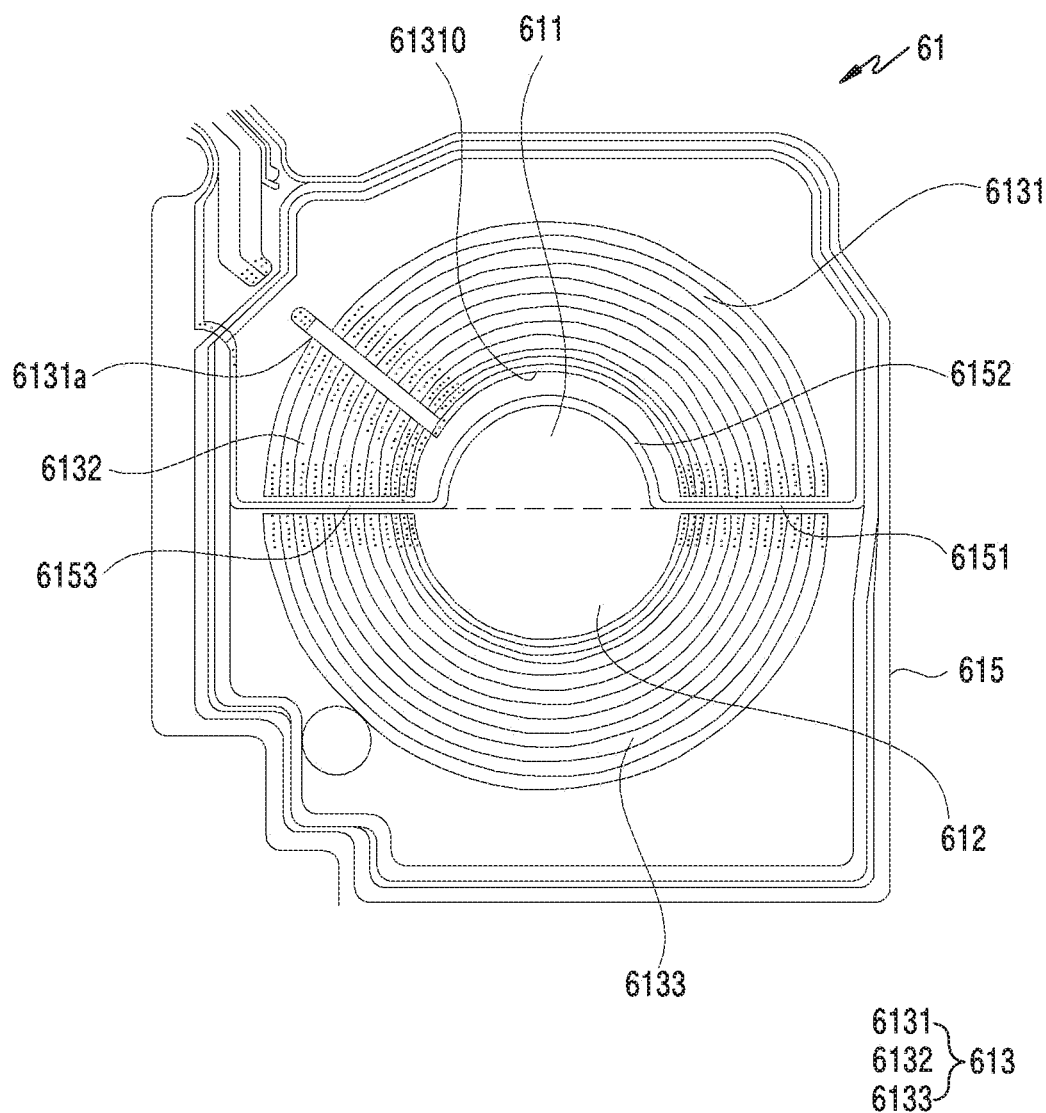
FIG. 12A is a plan view illustrating a first substrate layer of another antenna structure according to an embodiment of the disclosure.

FIG. 12A is a plan view illustrating a first substrate layer of another antenna structure according to an embodiment of the disclosure.

Figure 12B:
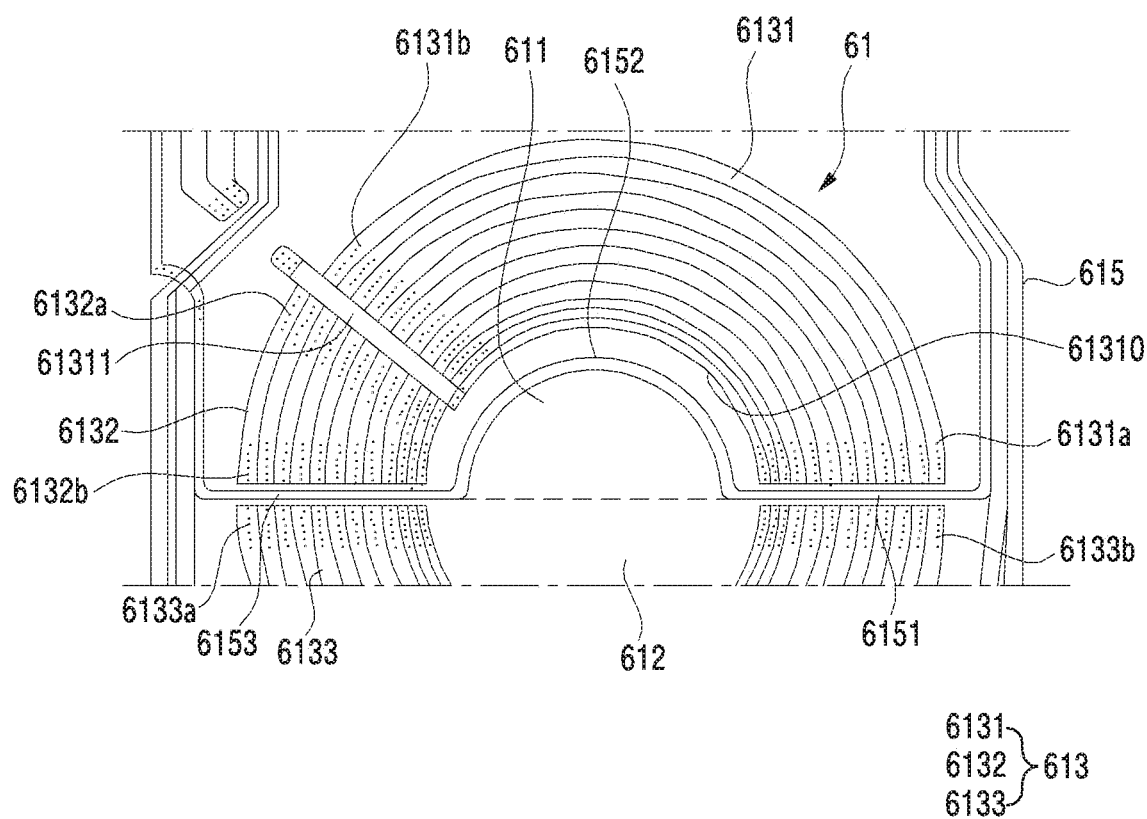
FIG. 12B is an enlarged view of a portion of FIG. 12A according to an embodiment of the disclosure.

FIG. 12B is an enlarged view of a portion of FIG. 12A according to an embodiment of the disclosure.

Referring to FIGS. 12A and 12B, the first substrate layer 61 according to an embodiment may be a conductive member having a conductor, for example, a wire or a pattern or the like, disposed on a layer of a film material. For example, the conductor may have at least one coil body or at least one conductive pattern or at least one conductive wire, disposed on an insulation layer. According to an embodiment, the conductor may be protected by the insulation layer (e.g., a protection layer).

According to an embodiment, the first substrate layer 61 may include at least one conductive wire 613 and a first antenna 615. For instance, the at least one conductive wire 613 may be disposed inside the first antenna 615. The first antenna 615 may be extended along a periphery of the at least one conductive wire 613. The first antenna 615 and the at least one conductive wire 613 may be spaced apart from each other by means of an insulation material. According to an embodiment, the first antenna 615 may be constructed of a conductive pattern having a substantially closed curve shape.

According to an embodiment, the first substrate layer 61 may include a first non-conductive area 611, a second non-conductive area 612, the first conductive wires 613, second conductive wires 6132, third conductive wires 6133, and the first antenna 615. According to an embodiment, the second non-conductive area 612 may be disposed adjacent to the first non-conductive area 611. The first and second non-conductive areas 611 and 612 have a substantially semi-circular shape, and may face each other.

According to an embodiment, first conductive wires 6131 may be constructed in a shape of surrounding at least part of the first non-conductive area 611. According to an embodiment, the second conductive wires 6132 may be constructed in a shape of surrounding another part of the second non-conductive area 611. According to an embodiment, the third conductive wires 6133 may be constructed in a shape of surrounding the second non-conductive area 612. The first and second conductive wires 6131 and 6132 and the third conductive wires 6133 may face each other. The first and second non-conductive areas 611 and 612 may have a substantially circular shape together, and the first to third conductive wires 6131, 6132, and 6133 may have a ring shape together. However, without being limited to these shapes, the first and second non-conductive areas 611 and 612 may have various shapes together, and the first to third non-conductive wires 6131, 6132, and 6133 may have various shapes together. For instance, the various shapes may include an oval or polygonal shape or the like. According to an embodiment, the first to third non-conductive wires 6131, 6132, and 6133 may be in proximity to each other and may be spaced apart from each other.

According to an embodiment, the first antenna 615 may be a conductive pattern constructed on an insulation layer of a film material. The first antenna 615 may be disposed in a shape of surrounding the first to third conductive wires 6131, 6132, and 6133. In addition, the first antenna 615 may be constructed in a designated shape in the first non-conductive area 611 or the second non-conductive area 612, traversing between the first and third conductive wires 6131 and 6133, thereby corresponding to a first frequency band.

In a conductive pattern of the first antenna 615 according to an embodiment, the conductive pattern traversing between the first to third conductive wires 6131, 6132, and 6133 may include a first linear-shaped conductive pattern 6151 located at one side between the first and third conductive wires 6131 and 6133, a curved-shaped conductive pattern 6152 constructed in the first non-conductive area 611 or the second non-conductive area 612, and a linear-shaped pattern 6153 located at the other side between the second and third conductive wires 6132 and 6133. For instance, the curved shape includes a semi-circular shape, but without being limited to these shapes, various shapes, such as a linear shape, a spiral shape, or the like, may also be possible.

According to an embodiment, the first and second linear-shaped conductive patterns 6151 and 6153 may be constructed in a state of being spaced apart respectively from the first to third conductive wires 6131, 6132, and 6133. In addition, the curved-shaped conductive pattern 6152 may be constructed in a state of being spaced apart from the first and second conductive wires 6131 and 6132. For instance, the curved-shaped conductive pattern 6152 may be constructed to be in proximity to a wire 61310 located at an innermost side of the first conductive wires 6131 with an interval in in the first non-conductive area 611. The wire 61310 located at the innermost side may include a linear-shaped wire 61311 traversing between the first and second conductive wires 6131 and 6132. The linear-shaped wire 61311 may be constructed in a state of being spaced apart respectively from the first and second conductive wires.

Referring to FIG. 12B, according to an embodiment, the first conductive wires 6131 include a plurality of first wires. Each of the first wires may have first and second via-holes 6131a and 6131b constructed respectively at both ends. The second conductive wires 6132 include a plurality of second wires. Each of the second wires may have third and fourth via-holes 6132a and 6132b constructed respectively at both ends. The third conductive wires 6133 include a plurality of third wires. Each of the third wires may have fifth and sixth via-holes 6133a and 6133b constructed respectively at both ends. For instance, the first via-holes 6131a and the sixth via-holes 6133b may be disposed in proximity in a state of being spaced apart from each other. The second via-holes 6131b and the third via-holes 6132b may be disposed in proximity in a state of being spaced apart from each other. The third via-holes 6132a and the fourth via-holes 6132b may be disposed in proximity in a state of being spaced apart from each other. The fourth via-holes 6132b and the fifth via-holes 6133a may be disposed in proximity in a state of being spaced apart from each other.

According to an embodiment, the first linear-shaped conductive wire 6151 may be disposed between the first and sixth via-holes 6131a and 6133b. A linear-shaped wire 61311 may be disposed between the second and third via-holes 6131b and 6132a. A second linear-shaped conductive wire 6153 may be disposed between the fourth and fifth via-holes 6132b and 6133a.

Figure 13A:
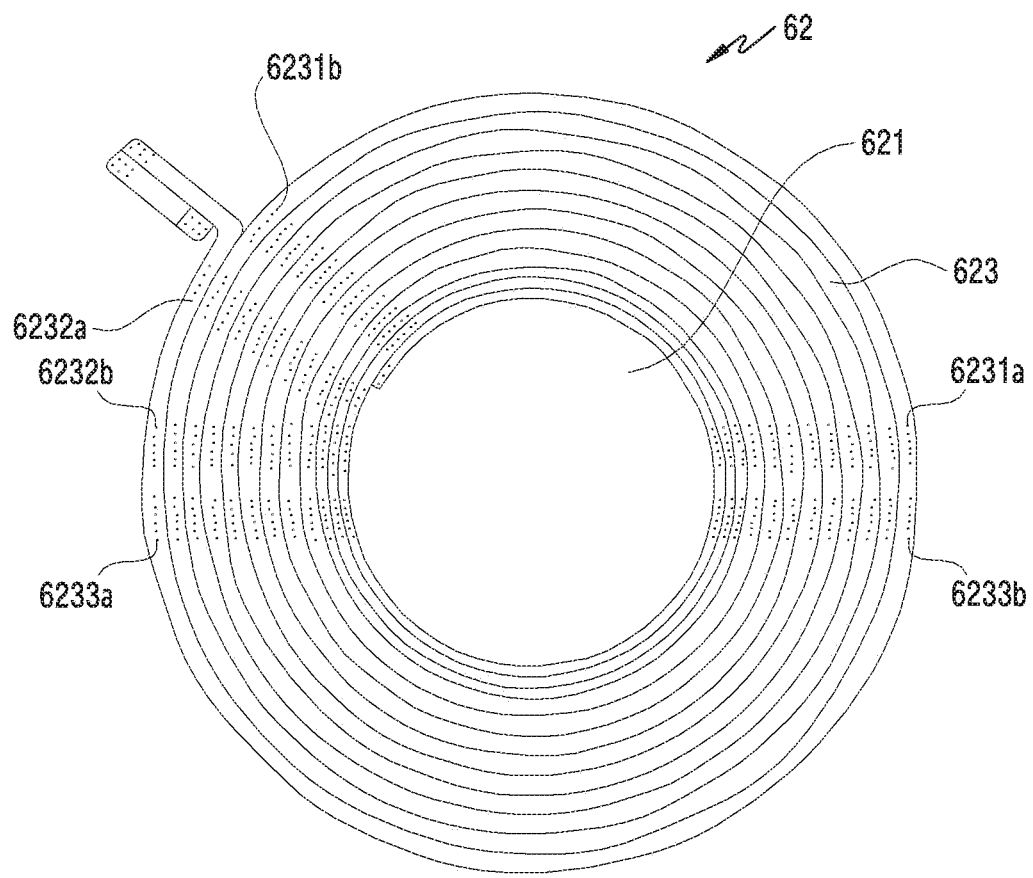
FIG. 13A is a plan view illustrating a second substrate layer of another antenna structure according to an embodiment of the disclosure.

FIG. 13A is a plan view illustrating a second substrate layer of another antenna structure according to an embodiment of the disclosure.

Figure 13B:
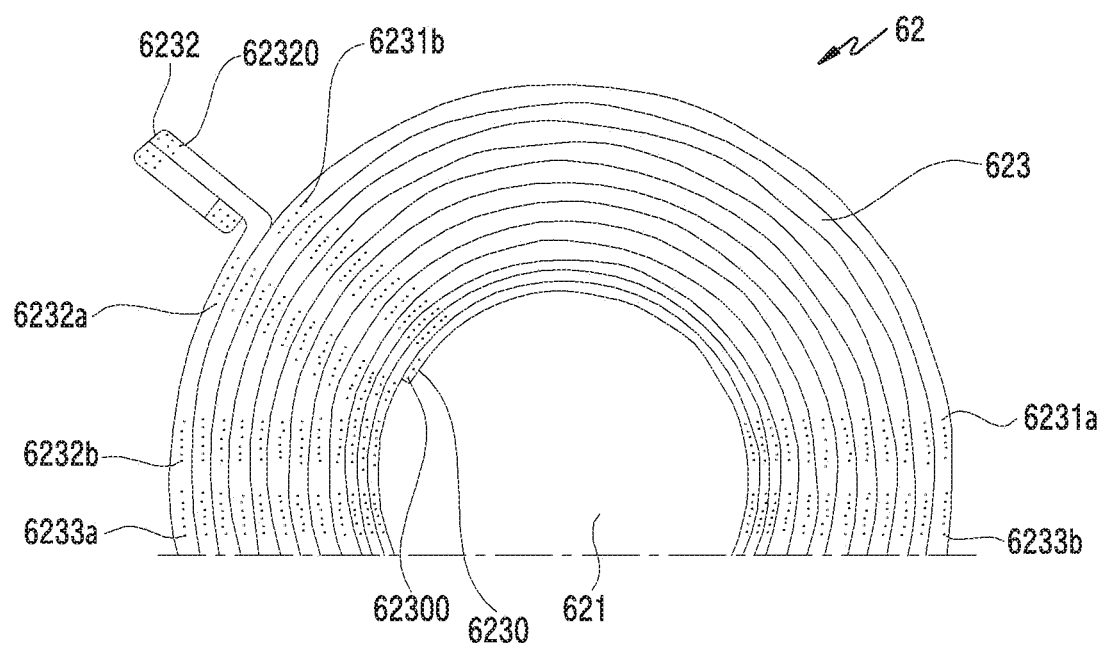
FIG. 13B is an enlarged view of a portion of FIG. 13A according to an embodiment of the disclosure.

FIG. 13B is an enlarged view of a portion of FIG. 13A according to an embodiment of the disclosure.

Referring to FIGS. 13A and 13B, the second substrate layer 62 according to an embodiment may be a conductive member having a conductor disposed on a film material. For example, the conductor may have at least one coil body or at least one conductive pattern or at least one conductive wire, disposed on an insulation layer. According to an embodiment, the conductor may be protected by the insulation layer (e.g., a protection layer).

According to an embodiment, the second substrate layer 62 may include a third non-conductive area 621, third conductive wires 623, and at least one of via-holes 6231a to 6233b.

According to an embodiment, the third non-conductive area 621 may have a substantially circular shape. According to an embodiment, the third non-conductive area 621 may be surrounded by conductive wires 623. According to an embodiment, the third conductive wires 623 may be constructed in a shape of surrounding the third non-conductive area 621, and may be constructed with a first winding, for example, a ring-shaped winding.

According to an embodiment, the conductive wire 623 of the second substrate layer may include the first to sixth via-holes 6231a to 6233b. The conductive wire 623 of the second substrate layer may include the first via-holes 6231a electrically coupled to first via-holes (e.g., the first via-holes 6131a of FIG. 12B) of a first substrate layer by means of a conductive structure, the second via-holes 6231b electrically coupled to second via-holes (e.g., the second via-holes 6131b of FIG. 12B) of the first substrate layer by means of the conductive structure, third via-holes 6232a electrically coupled to third via-holes (e.g., the third via-holes 6132a of FIG. 12B) of the first substrate layer by means of the conductive structure, fourth via-holes 6232b electrically coupled to fourth via-holes (e.g., the fourth via-holes 6132b of FIG. 12B) of the first substrate layer by means of the conductive structure, fifth via-holes 6233a electrically coupled to fifth via-holes (e.g., the fifth via-holes 6133a of FIG. 12B) of the first substrate layer by means of the conductive structure, and sixth via-holes 6233b electrically coupled to sixth via-holes (e.g., the sixth via-holes 6133b of FIG. 12B) of the first substrate layer by means of the conductive structure.

According to an embodiment, each of the first to sixth via-holes 6231a to 6233b of the second substrate layer may include a plurality of via-holes. The conductive wire 623 may include one end 6230 and the other end 6232. At least one of via-holes 62300 and 62320 may be constructed respectively at the ends 6230 and 6232. The first to sixth via-holes 6231a to 6233b may be filled with a conductive material to construct respective conductive structures.

For example, the first via-holes 6231a may be disposed towards substantially a center portion of the non-conductive area 621, and each of the second to sixth via-holes 6231b and 6233b may also be disposed towards substantially the center portion of the non-conductive area 621. According to an embodiment, the first and sixth via-holes 6231a and 6233b may be located symmetrical to the fourth and fifth via-holes 6232b and 6233a with respect to the center of the non-conductive area 621.

Figure 14:
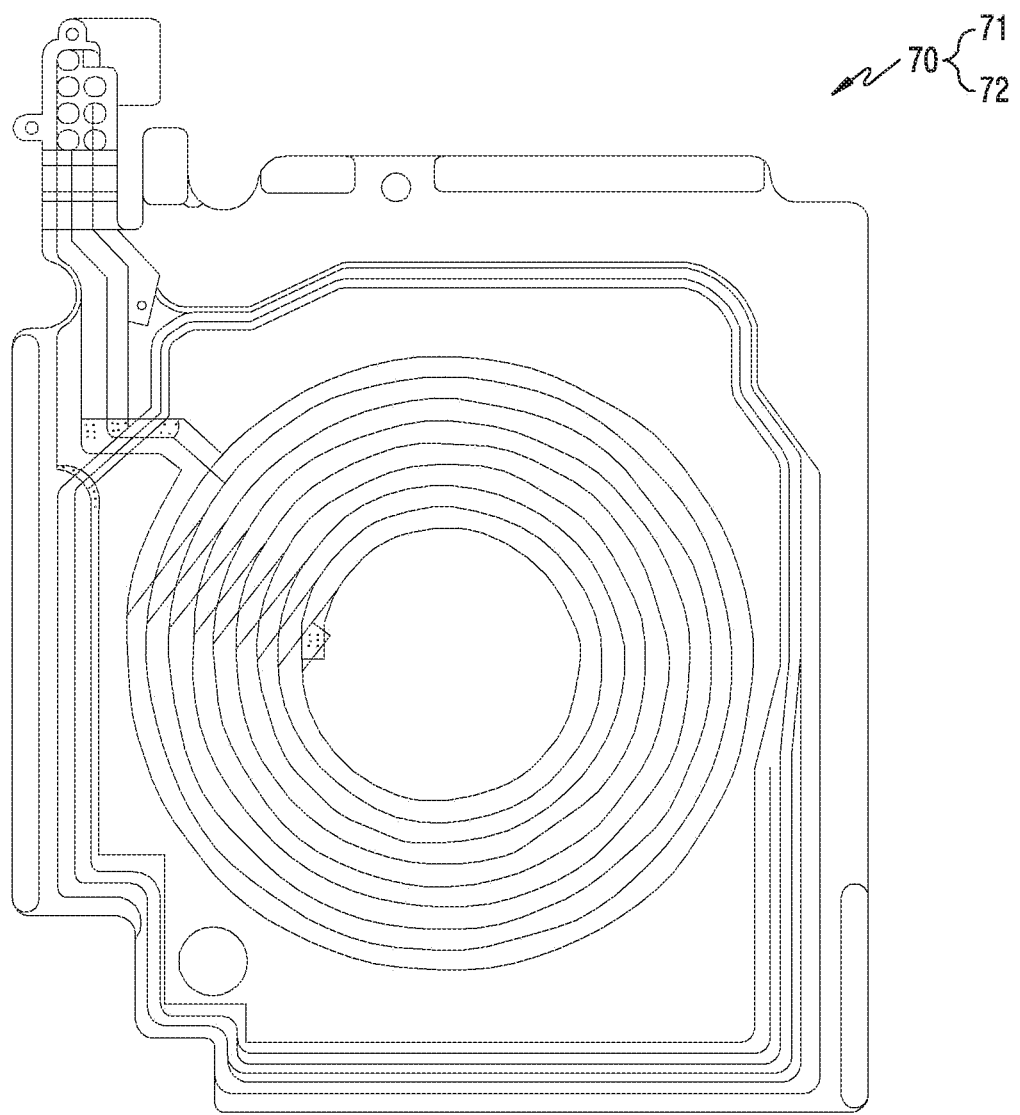
FIG. 14 is a plan view illustrating another antenna structure according to an embodiment of the disclosure.

FIG. 14 is a plan view illustrating another antenna structure according to an embodiment of the disclosure.

Referring to FIG. 14, as an antenna mounted on an electronic device (e.g., the electronic device 100 of FIG. 1), an antenna structure 70 (e.g., the antenna 370 of FIG. 3) according to various embodiments may be used, for example, as a wireless charging pad or an NFC antenna. According to an embodiment, the antenna structure 70 may include at least one conductor. For example, the at least one conductor may include a coil body or any one of a conductive wire and a conductive pattern or a combination thereof. The coil body may be disposed for wireless charging, and the conductive wire or the conductive pattern or the like may be disposed as a radiator for NFC.

According to an embodiment, the antenna structure 70 may be disposed between a rear case (e.g., a battery or support structure housed in the rear case) of the electronic device and a second plate (e.g., a back cover or a back glass) (e.g., the rear plate 111 of FIG. 2).

According to an embodiment, the antenna structure 70 may include a PCB including a first substrate layer 71 and a second substrate layer 72. For instance, each of the first and second substrate layers 71 and 72 is a film type and may be constructed of a flexible material. The first substrate layer 71 may include a first FPCB, and the second substrate layer may include a second FPCB. According to an embodiment, the first and second substrate layers 71 and 72 may be compressed and constructed as one PCB. For example, the first substrate layer 71 may be disposed to a lower portion, and the second substrate layer 72 may be disposed above the first substrate layer 71. According to an embodiment, the first and second substrate layers 71 and 72 may be electrically coupled with each other due to a conductive structure. For instance, the conductive structure may use a through-hole or via-hole filled with a conductive material.

According to an embodiment, in an antenna structure, the first and second substrate layers 71 and 72 may be electrically coupled in a series type by using a conductive structure, for example, at least one via-hole.

Figure 15A:
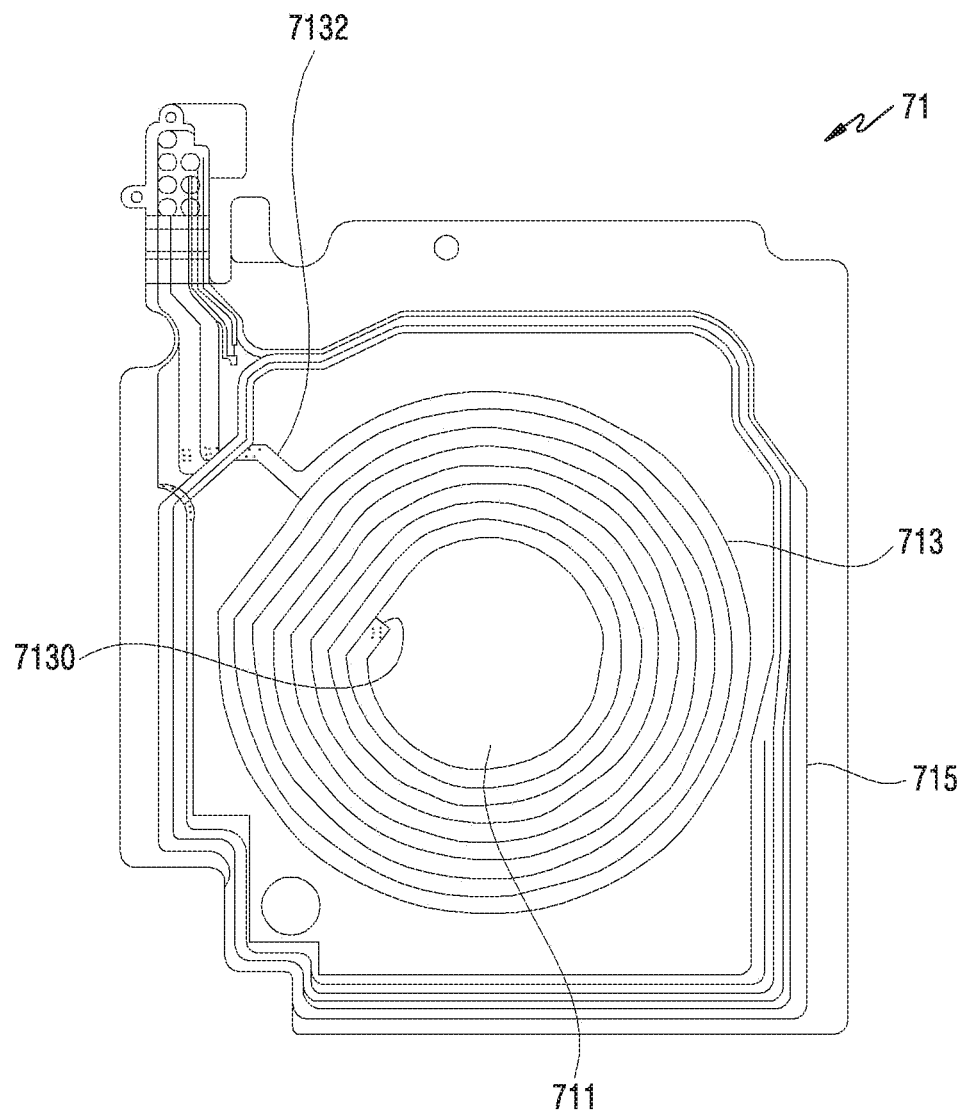
FIG. 15A is a plan view illustrating a first substrate layer of another antenna structure according to an embodiment of the disclosure.

FIG. 15A is a plan view illustrating a first substrate layer of another antenna structure according to an embodiment of the disclosure.

Figure 15B:
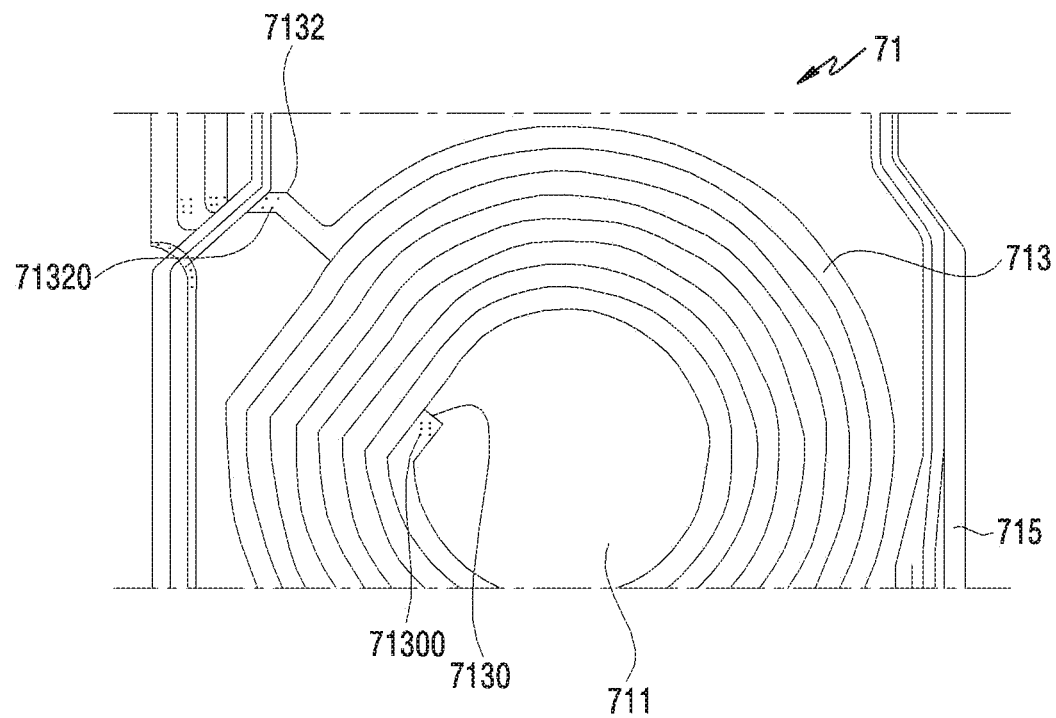
FIG. 15B is an enlarged view of a portion of FIG. 15A according to an embodiment of the disclosure.

FIG. 15B is an enlarged view of a portion of FIG. 15A according to an embodiment of the disclosure.

Referring to FIGS. 15A and 15B, the first substrate layer 71 according to an embodiment may be a conductive member having a conductor, for example, a wire or a pattern or the like, disposed on a layer of a film material. For example, the conductor may have at least one coil body or at least one conductive pattern or at least one conductive wire, disposed on an insulation layer. According to an embodiment, the conductor may be protected by the insulation layer (e.g., a protection layer).

According to an embodiment, the first substrate layer 71 may include at least one conductive wire 713 and a first antenna 715. For instance, the at least one conductive wire 713 may be disposed inside the first antenna 715. The first antenna 715 may be extended along a periphery of the at least one conductive wire 713. The first antenna 715 and the at least one conductive wire 713 may be spaced apart from each other by means of an insulation material. According to an embodiment, the first antenna 715 may be constructed of a conductive pattern having a substantially closed curve shape.

According to an embodiment, the first substrate layer 71 may include a non-conductive area 711, the conductive wires 713, and the antenna 715. According to an embodiment, the non-conductive area may have a substantially circular shape. According to an embodiment, the conductive wire may include a linear-shaped portion and a curved-shaped portion. It may be disposed such that the linear-shaped portion is engaged to the curved-shaped portion.

According to an embodiment, the conductive wire 713 may include one end 7130 and the other end 7132. For instance, the one end 7130 may be located at the non-conductive area 711 which is a center area, and the other end 7132 may be located outside the conductive wire 713. A plurality of first via-holes 71300 may be constructed at the one end 7130, and a plurality of second via-holes 71320 may be constructed at the other end 7132.

Figure 16A:
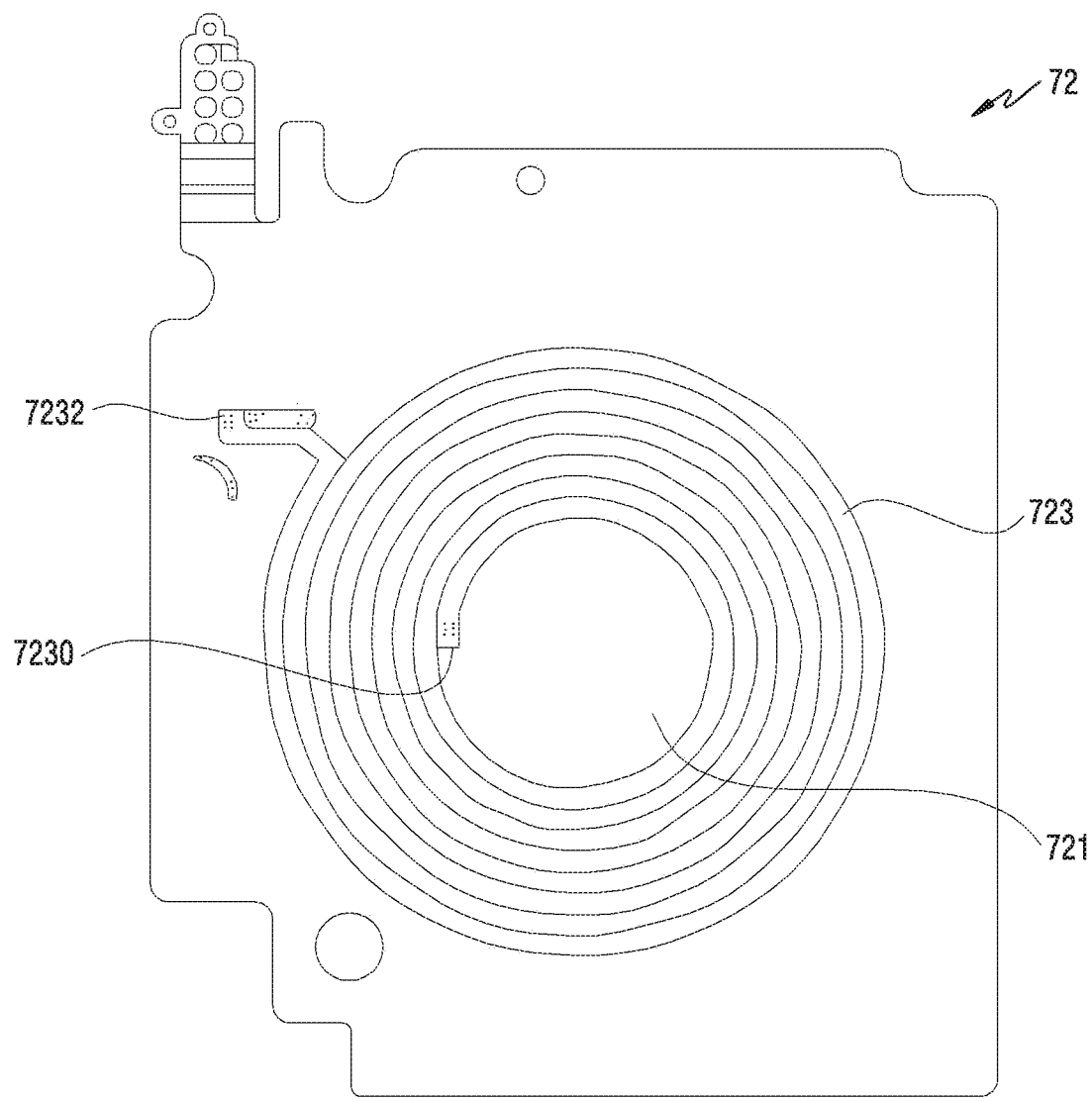
FIG. 16A is a plan view illustrating a second substrate layer of another antenna structure according to an embodiment of the disclosure.

FIG. 16A is a plan view illustrating a second substrate layer of another antenna structure according to an embodiment of the disclosure.

Figure 16B:
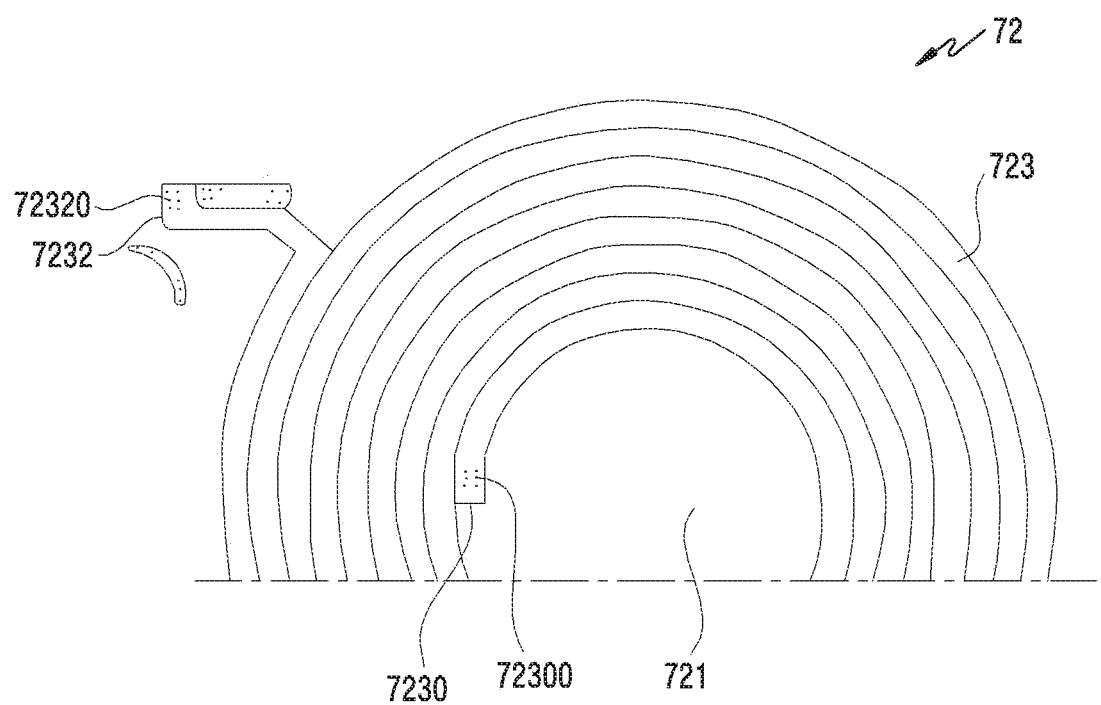
FIG. 16B is an enlarged view of a portion of FIG. 16A according to an embodiment of the disclosure.

FIG. 16B is an enlarged view of a portion of FIG. 16A according to an embodiment of the disclosure.

Referring to FIGS. 16A and 16B, the second substrate layer 72 according to an embodiment may be a conductive member having a conductor, for example, a wire or a pattern or the like, disposed on a layer of a film material. For example, the conductor may have at least one coil body or at least one conductive pattern or at least one conductive wire, disposed on an insulation layer. According to an embodiment, the conductor may be protected by the insulation layer (e.g., a protection layer).

According to an embodiment, the second substrate layer 72 may include a non-conductive area 721 and a conductive wire 723. For instance, the conductive wire 723 may have a spiral shape, and the non-conductive area 721 may have a substantially circular shape.

According to an embodiment, the conductive wire 723 may include one end 7230 and the other end 7232. For instance, the one end 7230 may be located at the non-conductive area 721 which is a center area, and the other end 7232 may be located outside the conductive wire 723. A plurality of first via-holes 72300 may be constructed at the one end 7230, and a plurality of second via-holes 72320 may be constructed at the other end 7232. The first via-holes 72300 of a second substrate layer may be electrically coupled in parallel with first via-holes (e.g., the first via-holes 71300 of FIG. 15B) of a first substrate layer by means of a conductive structure, and the second via-holes 72320 of the second substrate layer may be electrically coupled in parallel with second via-holes (e.g., the second via-holes 71320 of the first substrate layer by means if the conductive structure.

According to an embodiment, an antenna structure may include a PCB including a first substrate layer (e.g., the first substrate layer 41 of FIG. 5) and a second substrate layer (e.g., the second substrate layer 42 of FIG. 6). The first substrate layer may include a first non-conductive area (e.g., the first non-conductive area 411 of FIG. 5), a second non-conductive area (e.g., the second non-conductive area 412 of FIG. 5) adjacent to the first non-conductive area, at least one first conductive wire (e.g., the first conductive wires 413 of FIG. 5) constructed in a shape of surrounding the first non-conductive area except for at least part of a portion adjacent to the second non-conductive area, at least one second conductive wire (e.g., the second conductive wires 414 of FIG. 5) constructed in a shape of surrounding the second non-conductive area except for at least part of a portion adjacent to the first non-conductive area, and a first antenna (e.g., the first antenna 415 of FIG. 5) corresponding to a first frequency band and constructed in a designated shape in the first non-conductive area or the second non-conductive area, traversing between the at least one first conductive wire and the at least one second conductive wire. The second substrate layer (e.g., the second substrate layer 42 of FIG. 6) may include a third non-conductive area (e.g., the third non-conductive area 421 of FIG. 6) facing at least part of the first non-conductive area and second non-conductive area, a third wire (e.g., the third conductive wires 423 of FIG. 6) surrounding the third non-conductive area and constructed with a first winding, and at least one connection wire (e.g., the connection wires 425 and 426 of FIG. 6) which provides electrical coupling between the at least one first conductive wire and the at least one second conductive wire so that the at least one first conductive wire and the at least one second conductive wire are constructed with a second winding. The first winding and the second winding may be constructed as a second antenna corresponding to a second frequency band through a through-hole (e.g., the first and second via-holes 4261 and 4262 of FIG. 7) which provides electrical coupling between the first winding and the second winding.

According to an embodiment, the at least one connection wire (e.g., the connection wires 425 and 426 of FIG. 6), as a conductive pattern, may electrically couple the first and second conductive wires with each other.

According to an embodiment, the at least one connection wire (e.g., the connection wires 425 and 426 of FIG. 6) may have the through-hole constructed thereon. The through-hole may include at least one first through-hole (e.g., the first via-hole 4161 of FIG. 7) electrically coupled with the first conductive wires and filled with a conductive material, and at least one second through-hole (e.g., the second via-hole 4262 of FIG. 7) electrically coupled with the second conductive wire and filled with a conductive material.

According to an embodiment, the at least one connection wire (the connection wires 425 and 426 of FIG. 6) may include at least one first connection wire (e.g., the first connection wire 425 of FIG. 6) which electrically couples one end of the first conductive wires and one end of the second conductive wires, and at least one second connection wire (e.g., the second connection wire 426 of FIG. 6) which electrically couples the other end of the first conductive wires and the other end of the second conductive wires.

According to an embodiment, the first antenna (e.g., the first antenna 415 of FIG. 5) may include a first linear-shaped conductive pattern (e.g., the first linear-shaped conductive pattern 4151 of FIG. 5) constructed at one side between the first and second conductive wires, a curved-shaped conductive pattern (e.g., the curved-shaped conductive pattern 4152 of FIG. 5) extended from the first linear-shaped conductive pattern and constructed at the first non-conductive area or the second non-conductive area, and a second linear-shaped conductive pattern (e.g., the second conductive pattern 4153 of FIG. 5) extended from the curved-shaped pattern and constructed at the other side between the first and second conductive wires.

According to an embodiment, the curved-shaped conductive pattern (e.g., the curved-shaped conductive pattern 4152 of FIG. 5) may be constructed along a wire (e.g., the wire 4130 of FIG. 5) disposed to the innermost side of the first conductive wires or second conductive wires.

According to an embodiment, the at least one or more connection wires (e.g., the connection wires 425 and 426 of FIG. 6) may be disposed to be spaced apart from each other, and may be aligned along a direction traversing between the first and second conductive wires.

According to an embodiment, the first substrate layer (e.g., the first substrate layer 41 of FIG. 5) may include a first Flexible Printed Circuit Board (FPCB), and the second substrate layer (e.g., the second substrate layer 42 of FIG. 6) may include a second FPCB.

According to an embodiment, an antenna structure may include a PCB including a first substrate layer (e.g., the first substrate layer 51 of FIG. 9) and a second substrate layer (e.g., the second substrate layer 52 of FIG. 10). The first substrate layer may include a first non-conductive area (e.g., the non-conductive area 511 of FIG. 9), at least one first conductive wire (e.g., the first conductive wires 513 of FIG. 9) constructed in a shape of surrounding the first non-conductive area and disposed in such a manner that one end and the other end face each other in a state of being spaced apart from each other, and a first antenna (e.g., the first antenna 515 of FIG. 9) corresponding to a first frequency band and constructed in a designated shape in the first non-conductive area, traversing between one end and the other end (e.g., the one end 5131 and the other end 5132 of FIG. 9) of the at least one first conductive wire. The second substrate layer (e.g., the second substrate layer 52 of FIG. 10) may include a second non-conductive area (e.g., the second non-conductive area 521 of FIG. 10) facing at least part of the first non-conductive area, at least one second conductive wire (e.g., the second conductive wires 523 of FIG. 10) surrounding the second non-conductive area and constructed with a first winding, and at least one connection wire (e.g., the connection wires 525 of FIG. 10) which provides electrical coupling between one end and the other end of the at least one first conductive wire so that the one end of the at least one first conductive wire is constructed with a second winding. The first winding and the second winding may be constructed as a second antenna corresponding to a second frequency band through a through-hole (e.g., the first and second via-holes 4261 and 4262 of FIG. 7) which provides electrical coupling between the first winding and the second winding.

According to an embodiment, the at least one connection wire (e.g., the connection wires 425 and 426 of FIG. 6) may electrically couple the first and second conductive wires in a series type.

According to an embodiment, the at least one connection wire (e.g., the connection wires 425 and 426 of FIG. 6) may have a through-hole constructed thereon. The through-hole may include at least one first through-hole (e.g., the first via-hole 4161 of FIG. 7) electrically coupled with one end of the first conductive wires and filled with a conductive material, and at least one second through-hole (e.g., the second via-hole 4262 of FIG. 7) electrically coupled with the other end of the second conductive wires and filled with a conductive material.

According to an embodiment, the first antenna may include a first linear-shaped conductive pattern constructed between one end and the other end (e.g., the one end 5131 and the other end 5132 of FIG. 9) of the first conductive wires, and a curved-shaped conductive pattern extended from the first linear-shaped conductive pattern and constructed in the non-conductive area.

According to an embodiment, the curved-shaped conductive pattern may be constructed in a spiral shape in the non-conductive area.

According to an embodiment, the at least one or more connection wires (e.g., the connection wires 425 and 426 of FIG. 6) may be disposed to be spaced apart from each other, and are aligned along a direction traversing between one end and the other end of the first conductive wires.

According to an embodiment, an electronic device may include a housing (e.g., the housing 110 of FIG. 1) including a first plate (e.g., the front plate 102 of FIG. 1) facing a first direction and a second plate (e.g., the rear plate 111 of FIG. 2) facing a second direction facing away from the first direction, a display (e.g., the display 101 of FIG. 1) disposed to be at least partially exposed to the outside through at least part of the first plate, a PCB (e.g., the PCB 340 of FIG. 3) disposed between the first plate and the second plate, a support structure (e.g., the support structure 360 of FIG. 3) which supports the display in the first direction and supports the PCB in the second direction, and an antenna (e.g., the antenna 370 of FIG. 3) disposed between the support structure and the second plate. The antenna may include first and second FPCBs (e.g., the first and second substrate layers 41 and 42) which are compressed with each other. The first FPCB may include a first non-conductive area (e.g., the first non-conductive area 411 of FIG. 5), a second non-conductive area (e.g., the second non-conductive area 412 of FIG. 5) adjacent to the first non-conductive area, at least one first conductive pattern (e.g., the first conductive wires 413 of FIG. 5) constructed in a shape of surrounding the first non-conductive area, and at least one second conductive pattern (e.g., the second conductive wires 414 of FIG. 5) constructed in a shape of surrounding the second non-conductive area. The second FPCB may include a third non-conductive area (e.g., the third non-conductive area 421 of FIG. 6) facing at least part of the first non-conductive area and second non-conductive area, third conductive patterns (e.g., the third conductive wires 423 of FIG. 6) surrounding the third non-conductive area and constructed with a first winding, and at least one connection pattern (e.g., the connection wires 425 and 426 of FIG. 6) constructed to be isolated from the third conductive patterns and providing electrical coupling between the at least one first conductive pattern and the at least one second conductive pattern.

According to an embodiment, the at least one connection pattern (e.g., the connection wires 427 of FIG. 6) may electrically couple the first and second conductive patterns 425 and 426 in a series type.

According to an embodiment, the at least one connection pattern (e.g., the connection wires 425 and 426 of FIG. 6) may include at least one via-hole. The via-hole may include at least one first via-hole (e.g., the first via-hole 4261 of FIG. 7) electrically coupled with the first conductive patterns and filled with a conductive material, and at least one second via-hole (e.g., the second via-hole 4262 of FIG. 7) electrically coupled with the second conductive patterns and filled with a conductive material.

According to an embodiment, the at least one connection pattern (e.g., the connection wires 425 and 426 of FIG. 6) may include at least one first connection pattern (e.g., the connection wires 425 of FIG. 6) which electrically couples one end of the first conductive patterns and one end of the second conductive patterns, and at least one second connection pattern (e.g., the connection wires 426 of FIG. 6) which electrically couples the other end of the first conductive patterns and the other end of the second conductive patterns.

According to an embodiment, the first FPCB (e.g., the first substrate layer 41 of FIG. 5) may include a first linear-shaped conductive pattern (e.g., the first linear-shaped conductive pattern 4151 of FIG. 5) constructed at one side between the first and second conductive wires, a curved-shaped conductive pattern (e.g., the curved-shaped conductive pattern 4152 of FIG. 5) extended from the first linear-shaped pattern and constructed in the first non-conductive area or the second non-conductive area, and a second linear-shaped conductive pattern (e.g., the second linear-shaped conductive pattern 4153 of FIG. 5) extended from the curved-shaped conductive pattern and constructed at the other side between the first and second conductive wires.

According to an embodiment, each of the third conductive patterns may be constructed in such a manner that a width (e.g., the width w1 of FIG. 7) of a portion with the connection pattern is relatively smaller than a width (e.g., the width w2 of FIG. 7) of a portion without the connection pattern.

According to an embodiment, an antenna structure may include a PCB including a first substrate layer (e.g., the first substrate layer 41 of FIG. 5) and a second substrate layer (e.g., the second substrate layer 42 of FIG. 6).

The first substrate layer may include a first non-conductive area (e.g., the first non-conductive area 411 of FIG. 5), a second non-conductive area (e.g., the second non-conductive area 412 of FIG. 5) adjacent to the first non-conductive area, at least one first conductive wire (e.g., the first conductive wires 413 of FIG. 5) constructed in a shape of surrounding the first non-conductive area except for at least part of a portion adjacent to the second non-conductive area, at least one second conductive wire (e.g., the second conductive wires 414 of FIG. 5) constructed in a shape of surrounding the second non-conductive area except for at least part of a portion adjacent to the first non-conductive area, and at least one third wire (e.g., the wires 4152 of FIG. 5) constructed in a designated shape in the first non-conductive area or the second non-conductive area, traversing between the at least one first conductive wire and the at least one second conductive wire.

The second substrate layer (e.g., the second substrate layer 42 of FIG. 6) may include a third non-conductive area (e.g., the third non-conductive area 421 of FIG. 6) facing at least part of the first non-conductive area and second non-conductive area, a fourth wire (e.g., the third conductive wires 423 of FIG. 6) surrounding the third non-conductive area, constructed with a winding; and electrically coupled with a designated wire among the at least one first wire through a through-hole, and at least one connection wire (e.g., the connection wires 425 and 426 of FIG. 6) which provides electrical coupling between the at least one first conductive wire and the at least one second conductive wire so that the at least one first conductive wire and the at least one second conductive wire are constructed with a winding.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna structure comprising:
a printed circuit board (PCB) including a first substrate layer and a second substrate layer,
wherein the first substrate layer comprises:
a first non-conductive area,
a second non-conductive area adjacent to the first non-conductive area,
at least one first conductive wire constructed in a shape surrounding the first non-conductive area except for at least a portion adjacent to the second non-conductive area,
at least one second conductive wire facing and disposed apart from the at least one first conductive wire and constructed in a shape surrounding the second non-conductive area, and
a first antenna corresponding to a first frequency band and constructed in a designated shape in the first non-conductive area or the second non-conductive area, traversing between the at least one first conductive wire and the at least one second conductive wire,
wherein the second substrate layer comprises:
a third non-conductive area facing at least part of the first non-conductive area and second non-conductive area,
a third wire surrounding the third non-conductive area and constructed with a first winding, and
at least one connection wires configured to electrically couple the at least one first conductive wire and the at least one second conductive wire so that the at least one first conductive wire and the at least one second conductive wire are constructed with a second winding, and
wherein the first winding and the second winding are constructed as a second antenna corresponding to a second frequency band through a through-hole which provides electrical coupling between the first winding and the second winding.

2. The antenna structure of claim 1, wherein the at least one connection wire electrically couples the first and second conductive wires.

3. The antenna structure of claim 1,
wherein the at least one connection wire has the through-hole constructed thereon, and
wherein the through-hole comprises:

at least one first through-hole electrically coupled with the first conductive wires and filled with a conductive material, and at least one second through-hole electrically coupled with the second conductive wire and filled with a conductive material.

4. The antenna structure of claim 1, wherein the at least one connection wire comprises:

at least one first connection wire which electrically couples one end of the first conductive wires and one end of the second conductive wires; and at least one second connection wire which electrically couples the other end of the first conductive wires and the other end of the second conductive wires.

5. The antenna structure of claim 1, wherein the first antenna comprises:

a first linear-shaped conductive pattern constructed at one side between the first and second conductive wires, a curved-shaped conductive pattern extended from the first linear-shaped conductive pattern and constructed at the first non-conductive area or the second non-conductive area, and a second linear-shaped conductive pattern extended from the curved-shaped pattern and constructed at the other side between the first and second conductive wires.

6. The antenna structure of claim 5, wherein the curved-shaped conductive pattern is constructed along a wire disposed on an innermost side of the first conductive wires or second conductive wires.

7. The antenna structure of claim 1, wherein the at least one or more connection wires are disposed to be spaced apart from each other, and to be aligned along a direction traversing between the first and second conductive wires.

8. The antenna structure of claim 1, wherein the first substrate layer includes a first flexible printed circuit board (FPCB), and wherein the second substrate layer includes a second FPCB.

9. An antenna structure comprising a printed circuit board (PCB) including a first substrate layer and a second substrate layer, wherein the first substrate layer comprises:

a first non-conductive area, at least one first conductive wire constructed in a shape surrounding the first non-conductive area and disposed such that one end and the other end face each other and are spaced apart from each other, and a first antenna corresponding to a first frequency band and constructed in a designated shape in the first non-conductive area, traversing between one end and the other end of the at least one first conductive wire, wherein the second substrate layer comprises:

a second non-conductive area facing at least part of the first non-conductive area, at least one second conductive wire surrounding the second non-conductive area and constructed with a first winding, and at least one connection wire configured to electrically couple one end and the other end of the at least one first conductive wire so that the one end of the at least one first conductive wire is constructed with a second winding, and wherein the first winding and the second winding are constructed as a second antenna corresponding to a second frequency band through a through-hole which provides electrical coupling between the first winding and the second winding.

10. The antenna structure of claim 9, wherein the at least one connection wire electrically couples the first and second conductive wires in series.

11. The antenna structure of claim 9, wherein the at least one connection wire has a through-hole constructed thereon, and wherein the through-hole comprises:

at least one first through-hole electrically coupled with one end of the first conductive wires and filled with a conductive material, and at least one second through-hole electrically coupled with the other end of the second conductive wires and filled with a conductive material.

12. The antenna structure of claim 9, wherein the first antenna comprises:

a first linear-shaped conductive pattern constructed between one end and the other end of the first conductive wires, and a curved-shaped conductive pattern extended from the first linear-shaped conductive pattern and constructed in the non-conductive area.

13. The antenna structure of claim 12, wherein the curved-shaped conductive pattern is constructed in a spiral shape in the non-conductive area.

14. The antenna structure of claim 9, wherein the at least one or more connection wires are disposed to be spaced apart from each other, and to be aligned along a direction traversing between one end and the other end of the first conductive wires.

15. An electronic device comprising:

a housing including a first plate facing a first direction and a second plate facing a second direction facing away from the first direction;

a display disposed to be at least partially exposed to the outside through at least part of the first plate;

a printed circuit board (PCB) disposed between the first plate and the second plate;

a support structure configured to support the display in the first direction and support the PCB in the second direction; and an antenna disposed between the support structure and the second plate, wherein the antenna comprises a first flexible printed circuit board (FPCB) and a second FPCB which are compressed with each other, wherein the first FPCB comprises:

a first non-conductive area, a second non-conductive area adjacent to the first non-conductive area, at least one first conductive pattern constructed in a shape surrounding the first non-conductive area, and at least one second conductive pattern facing and disposed apart from the at least one first conductive pattern and constructed in a shape surrounding the second non-conductive area, and wherein the second FPCB comprises:

a third non-conductive area facing at least part of the first non-conductive area and second non-conductive area, third conductive patterns surrounding the third non-conductive area and constructed with a first winding, and at least one connection pattern constructed to be isolated from the third conductive patterns and providing electrical coupling between the at least one first conductive pattern and the at least one second conductive pattern.

16. The electronic device of claim 15, wherein the at least one connection pattern electrically couples the first and second conductive patterns in series.

17. The electronic device of claim 15, wherein the at least one connection pattern includes at least one via-hole, and wherein the via-hole comprises:

at least one first via-hole electrically coupled with the first conductive patterns and filled with a conductive material, and at least one second via-hole electrically coupled with the second conductive patterns and filled with a conductive material.

18. The electronic device of claim 15, wherein the at least one connection pattern comprises:

at least one first connection pattern which electrically couples one end of the first conductive patterns and one end of the second conductive patterns; and at least one second connection pattern which electrically couples the other end of the first conductive patterns and the other end of the second conductive patterns.

19. The electronic device of claim 15, wherein the first FPCB comprises:

a first linear-shaped conductive pattern constructed at one side between first and second conductive wires, a curved-shaped conductive pattern extended from the first linear-shaped pattern and constructed in the first non-conductive area or the second non-conductive area, and a second linear-shaped conductive pattern extended from the curved-shaped conductive pattern and constructed at the other side between the first and second conductive wires.

20. The electronic device of claim 15, wherein each of the third conductive patterns are constructed such that a portion with the connection pattern has a relatively smaller width than a portion without the connection pattern.

* * * * *